(12) United States Patent
Jung et al.

(10) Patent No.: US 12,401,809 B2
(45) Date of Patent: Aug. 26, 2025

(54) VIDEO SIGNAL PROCESSING METHOD AND APPARATUS USING SCALING PROCESS

(71) Applicant: HUMAX CO., LTD., Yongin-Si (KR)

(72) Inventors: Jaehong Jung, Seoul (KR); Juhyung Son, Uiwang-Si (KR); Dongcheol Kim, Suwon-Si (KR); Geonjung Ko, Seoul (KR); Jinsam Kwak, Uiwang-si (KR)

(73) Assignee: HUMAX CO., LTD., Yongin-Si (KR)

( * ) Notice: Subject to any disclaimer, the term of this patent is extended or adjusted under 35 U.S.C. 154(b) by 0 days.

(21) Appl. No.: 18/731,011

(22) Filed: May 31, 2024

(65) Prior Publication Data

US 2024/0323412 A1 Sep. 26, 2024

Related U.S. Application Data

(63) Continuation of application No. 17/655,354, filed on Mar. 17, 2022, now Pat. No. 12,034,945, which is a
(Continued)

(30) Foreign Application Priority Data

Sep. 19, 2019 (KR) .................. 10-2019-0115656
Jan. 11, 2020 (KR) .................. 10-2020-0003951

(51) Int. Cl.
*H04N 19/00* (2014.01)
*H04N 19/159* (2014.01)
(Continued)

(52) U.S. Cl.
CPC ........... *H04N 19/30* (2014.11); *H04N 19/159* (2014.11); *H04N 19/176* (2014.11);
(Continued)

(58) Field of Classification Search
CPC .... H04N 19/30; H04N 19/159; H04N 19/176; H04N 19/186; H04N 19/46; H04N 19/96;
(Continued)

(56) References Cited

U.S. PATENT DOCUMENTS 5,970,162 A * 10/1999 Kawashima ........... H04N 7/142
348/14.05
6,184,781 B1 * 2/2001 Ramakesavan .......... B60Q 1/52
348/148
(Continued)

FOREIGN PATENT DOCUMENTS

CN 104521232 A 4/2015
CN 107835414 A 3/2018
(Continued)

OTHER PUBLICATIONS

Office Action for IN202227016756 from Intellectual Property India dated Nov. 21, 2022.
(Continued)

*Primary Examiner* — Frank F Huang
(74) *Attorney, Agent, or Firm* — BROADVIEW IP LAW, PC

(57) ABSTRACT

The present disclosure relates to a processing method of a video signal, the processing method comprising the steps of: scaling a transform coefficient for a current block on the basis of an intermediate scaling factor array; when the flag indicates that a low frequency non-separable transform is applied to the current block, obtaining a residual for the current block by applying an inverse transform of a non-separable transform and an inverse transform of a primary transform on the scaled transform coefficient, wherein the primary transform is a transform applied to a residual signal of a spatial domain before the low frequency non-separable
(Continued)

transform; and reconstructing the current block on the basis of the residual and a predictor of the current block.

20 Claims, 21 Drawing Sheets

Related U.S. Application Data continuation of application No. PCT/KR2020/012706, filed on Sep. 21, 2020.

(51) Int. Cl.
*H04N 19/176* (2014.01)
*H04N 19/186* (2014.01)
*H04N 19/30* (2014.01)
*H04N 19/46* (2014.01)
*H04N 19/96* (2014.01)

(52) U.S. Cl.
CPC ........... *H04N 19/186* (2014.11); *H04N 19/46* (2014.11); *H04N 19/96* (2014.11)

(58) Field of Classification Search
CPC .... H04N 19/174; H04N 19/18; H04N 19/119; H04N 19/12; H04N 19/122; H04N 19/129; H04N 19/48; H04N 19/70; H04N 19/60
See application file for complete search history.

(56) References Cited

U.S. PATENT DOCUMENTS

| | | | | |
|---|---|---|---|---|
| 7,103,545 | B2* | 9/2006 | Furuta | E02F 9/26 704/275 |
| 7,466,337 | B2* | 12/2008 | Sawada | E02F 9/0858 348/148 |
| 7,640,107 | B2* | 12/2009 | Shimizu | B60K 35/00 382/104 |
| 9,332,229 | B2* | 5/2016 | Ishimoto | G06V 20/58 |
| 9,519,832 | B2* | 12/2016 | Lee | B60R 1/27 |
| 12,034,945 | B2 | 7/2024 | Jung et al. | |
| 2003/0122930 | A1* | 7/2003 | Schofield | B60R 1/23 348/E7.086 |
| 2003/0222793 | A1* | 12/2003 | Tanaka | B60Q 9/004 348/148 |
| 2009/0238271 | A1 | 9/2009 | Kim et al. | |
| 2010/0118146 | A1* | 5/2010 | Schofield | B60R 1/30 348/148 |
| 2010/0245577 | A1* | 9/2010 | Yamamoto | B60R 1/27 348/148 |
| 2011/0285848 | A1* | 11/2011 | Han | B60R 1/27 348/148 |
| 2012/0069153 | A1* | 3/2012 | Mochizuki | B60R 1/27 348/148 |
| 2015/0189289 | A1 | 7/2015 | Kim et al. | |
| 2016/0219290 | A1 | 7/2016 | Zhao et al. | |
| 2016/0269730 | A1 | 9/2016 | Jeon et al. | |
| 2018/0288439 | A1 | 10/2018 | Hsu et al. | |
| 2019/0007682 | A1 | 1/2019 | Kanoh et al. | |
| 2019/0387241 | A1 | 12/2019 | Kim et al. | |
| 2020/0097617 | A1* | 3/2020 | Zhilinsky | G06T 11/00 |
| 2021/0076070 | A1* | 3/2021 | Jung | H04N 19/70 |
| 2021/0185358 | A1* | 6/2021 | Jung | H04N 19/119 |
| 2022/0191492 | A1* | 6/2022 | Xu | H04N 19/122 |
| 2022/0210451 | A1* | 6/2022 | Jung | H04N 19/174 |

FOREIGN PATENT DOCUMENTS

| | | |
|---|---|---|
| KR | 10-2018-0063186 A | 6/2018 |
| WO | 2014/071439 A1 | 5/2014 |
| WO | 2018-166429 A1 | 9/2018 |
| WO | 2018-174402 A1 | 9/2018 |

OTHER PUBLICATIONS

Office Action for CN 202080065511.5 by China National Intellectual Property Administration dated Dec. 6, 2023.
Bross, Benjamin et al. (2019). "Versatile Video Coding (Draft 6)", Joint Video Experts Team (JVET) of ITU-T SG 16 WP 3 and ISO/IEC JTC 1/SC 29/WG 11. JVET-O2001-vD.
International Search Report & Written Opinion for PCT/KR2020/012706, the International Searching Authority, Dec. 30, 2020.
Benjamin Bross et al. Versatile Video Coding (Draft 6), Joint Video Experts Team (JVET) of ITU-T SG 16 WP 3 and ISO/IEC JTC 1/SC 29/WG 11, JVET-O2001-vE, 15th Meeting: Gothenburg, SE, pp. 1-439, Jul. 31, 2019 [Retrieved on Dec. 2, 2020], Retrieved from <http://phenix.int-evry.fr/jvet></http:>. See pp. 46-66, 142-153, 283-304.
Seethal Paluri et al. AHG17: APS support for default and user defined scaling matrices, Joint Video Experts Team (JVET) of ITU-T SG 16 WP 3 and ISO/IEC JTC 1/SC 29/WG 11, JVET-O0299_r1, 15th Meeting: Gothenburg, SE, pp. 1-5, Jul. 6, 2019, [Retrieved on Dec. 2, 2020], Retrieved from <http:/phenix.int-evry.fr/jvet></http:>, See p. 1.
Tomonori Hashimoto et al. Non-CE7: Harmonization of scaling matrix and LFNST, JVET-O0383, Joint Video Experts Team (JVET) of ITU-T SG 16 WP 3 and ISO/IEC JTC 1/SC 29/WG 11, 15th Meeting: Gothenburg, SE, Jul. 3-12, 2019.
Office Action for U.S. Appl. No. 17/655,354 by United States Patent and Trademark Office dated Nov. 15, 2024.
Notice of Allowance for U.S. Appl. No. 17/655,354 by United States Patent and Trademark Office dated Feb. 29, 2024.
Hashimoto, Tomonori et al. "Non-CE7: Harmonization of scaling matrix and LFNST", Joint Video Experts Team (JVET) of ITU-T SG16 WP3 and ISO/IEC JTC 1/SC29/WG11. JVET-O0383_WD, XP030219416. Jul. 2019.
Ma, Tsung-Chuan et al. "Lossless coding for VVC", Joint Video Experts Team (JVET) of ITU-T SG16 WP3 and ISO/IEC JTC 1/SC29/WG11. JVET-O1061, XP030208122. Jul. 2019.
Hearing Notice for IN 202227016756 by Intellectual Property India dated Aug. 16, 2024.
Notice of Allowance for CN 202080065511.5 by China National Intellectual Property Administration dated May 7, 2024.
Office Action for MX/a/2022/003187 by Mexican Institute of Industrial Property dated Feb. 28, 2025.
Office Action for BR 112022005281-2 by National Institute of Industrial Property (Brazil) dated Mar. 25, 2025.
Chubach, Olena et al., "CE7-related: Support of quantization matrices for VVC,"Joint Video Experts Team (JVET) of ITU-T SG 16 WP 3 and ISO/IEC JTC 1/SC 29/WG 11, Mar. 2019. doc: JVET-N0847-v1.
Koo, Moonmo et al., "CE6: Reduced Secondary Transform (RST) (CE6-3.1)," Joint Video Experts Team (JVET) of ITU-T SG 16 WP 3 and ISO/IEC JTC 1/SC 29/WG 11, Mar. 2019. doc: JVET-N0193.

* cited by examiner

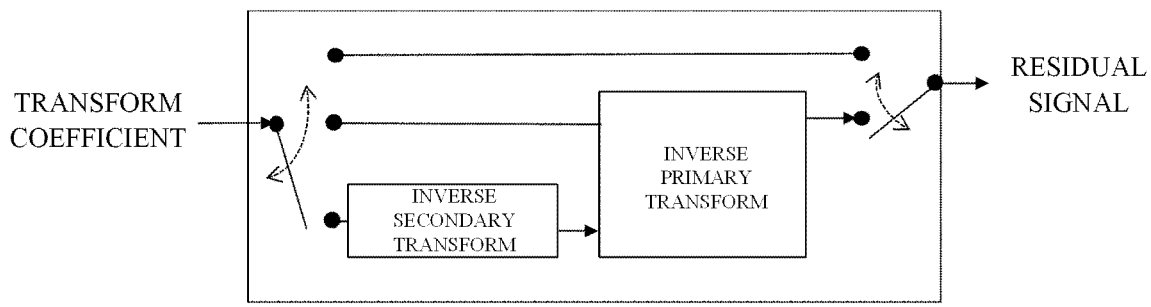

Fig. 8

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br><br> where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right),$ <br><br> where $\omega_0 = \begin{cases} \sqrt{\dfrac{2}{N}} & i = 0 \\ 1 & i \neq 0 \end{cases}, \omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

(b)

| Transform Set | Transform Candidates |
|---|---|
| 0 | DST-VII, DCT-VIII |
| 1 | DST-VII, DST-I |
| 2 | DST-VII, DCT-V |

(c)

| Transform Set | Transform Candidates |
|---|---|
| 0 | DCT-VIII, DST-VII |

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |
| Intra Mode | 18 | 19 | 20 | 21 | 22 | 23 | 24 | 25 | 26 | 27 | 28 | 29 | 30 | 31 | 32 | 33 | 34 | |
| V | 0 | 0 | 0 | 0 | 0 | 1 | 0 | 1 | 0 | 1 | 0 | 1 | 0 | 1 | 0 | 1 | 0 | |
| H | 2 | 2 | 2 | 2 | 2 | 1 | 0 | 1 | 0 | 1 | 0 | 1 | 0 | 1 | 0 | 1 | 0 | |
| Intra Mode | 35 | 36 | 37 | 38 | 39 | 40 | 41 | 42 | 43 | 44 | 45 | 46 | 47 | 48 | 49 | 50 | 51 | 52 |
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |
| Intra Mode | 53 | 54 | 55 | 56 | 57 | 58 | 59 | 60 | 61 | 62 | 63 | 64 | 65 | 66 | | | | |
| V | 2 | 2 | 1 | 0 | 1 | 0 | 1 | 0 | 1 | 0 | 1 | 0 | 1 | 0 | | | | |
| H | 0 | 0 | 1 | 0 | 1 | 0 | 1 | 0 | 1 | 0 | 1 | 0 | 1 | 0 | | | | |

(b)

| Transform Set | Transform Candidates |
|---|---|
| 0 | DST-VII, DCT-VIII |
| 1 | DST-VII, DST-I |
| 2 | DST-VII, DCT-V |

(c)

| Transform Set | Transform Candidates |
|---|---|
| 0 | DCT-VIII, DST-VII |

*Fig. 13*

6.5.2 Up-right diagonal scan order array initialization process

Input to this process is a block width blkWidth and a block size height blkHeight.

Output of this process is the array diagScan[ sPos ][ sComp ]. The array index sPos specify the scan position ranging from 0 to ( blkWidth * blkHeight ) − 1. The array index sComp equal to 0 specifies the horizontal component and the array index sComp equal to 1 specifies the vertical component. Depending on the value of blkWidth and blkHeight, the array diagScan is derived as follows:

```
i = 0
x = 0
y = 0
stopLoop = FALSE
while( !stopLoop ) {
  while( y >= 0 ) {
    if( x < blkWidth && y < blkHeight ) {
      diagScan[ i ][ 0 ] = x
      diagScan[ i ][ 1 ] = y
      i++
    }
    y– –
    x++
  }
  y = x
  x = 0
  if( i >= blkWidth * blkHeight )
    stopLoop = TRUE
```

For log2BlockWidth ranging from 0 to 4 and for log2BlockHeight ranging from 0 to 4, inclusive, the up-right diagonal scan order array initialization process as specified in clause 6.5.2 is invoked with 1 << log2BlockWidth and 1 << log2BlockHeight as inputs, and the output is assigned to DiagScanOrder[ log2BlockWidth ][ log2BlockHeight ].

*Fig. 16*

DiagScanOrder[2][2]

| y \ x | 0 | 1 | 2 | 3 |
|---|---|---|---|---|
| 0 | 0 | 2 | 5 | 9 |
| 1 | 1 | 4 | 8 | 12 |
| 2 | 3 | 7 | 11 | 14 |
| 3 | 6 | 10 | 13 | 15 |

DiagScanOrder[3][3]

| y \ x | 0 | 1 | 2 | 3 | 4 | 5 | 6 | 7 |
|---|---|---|---|---|---|---|---|---|
| 0 | 0 | 2 | 5 | 9 | 14 | 20 | 27 | 35 |
| 1 | 1 | 4 | 8 | 13 | 19 | 26 | 34 | 42 |
| 2 | 3 | 7 | 12 | 18 | 25 | 33 | 41 | 48 |
| 3 | 6 | 11 | 17 | 24 | 32 | 40 | 47 | 53 |
| 4 | 10 | 16 | 23 | 31 | 39 | 46 | 52 | 57 |
| 5 | 15 | 22 | 30 | 38 | 45 | 51 | 56 | 60 |
| 6 | 21 | 29 | 37 | 44 | 50 | 55 | 59 | 62 |
| 7 | 28 | 36 | 43 | 49 | 54 | 58 | 61 | 63 |

*Fig. 17*

7.3.2.5 Adaptation parameter set syntax

| adaptation_parameter_set_rbsp( ) { | Descriptor |
|---|---|
|   adaptation_parameter_set_id | u(5) |
|   aps_params_type | u(3) |
|   if( aps_params_type == ALF_APS ) | |
|     alf_data( ) | |
|   else if( aps_params_type == LMCS_APS ) | |
|     lmcs_data( ) | |
|   else if( aps_params_type == SCALING_APS ) | |
|     scaling_list_data( ) | |
|   ... | u(1) |
|   rbsp_trailing_bits( ) | |
| } | |

*Fig. 18*

7.3.6.1 General slice header syntax

| slice_header( ) { | Descriptor |
|---|---|
|   ... | |
|   if( sps_scaling_list_enabled_flag ) { | |
|     slice_scaling_list_present_flag | u(1) |
|     if( slice_scaling_list_present_flag ) | |
|       slice_scaling_list_aps_id | u(3) |
|   } | |
|   ... | |
|   byte_alignment( ) | |
| } | |

| Size of quantization matrix | sizeId |
|---|---|
| 1x1 | 0 |
| 2x2 | 1 |
| 4x4 | 2 |
| 8x8 | 3 |
| 16x16 | 4 |
| 32x32 | 5 |
| 64x64 | 6 |

(b)

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5, 6 | MODE_INTRA | 1 (Cb) | 1 |
| 1, 2, 3, 4, 5, 6 | MODE_INTRA | 2 (Cr) | 2 |
| 2, 3, 4, 5, 6 | MODE_INTER, MODE_IBC | 0 (Y) | 3 |
| 1, 2, 3, 4, 5, 6 | MODE_INTER, MODE_IBC | 1 (Cb) | 4 |
| 1, 2, 3, 4, 5, 6 | MODE_INTER, MODE_IBC | 2 (Cr) | 5 |

*Fig. 20*

7.3.2.16 Scaling list data syntax

| scaling_list_data( ) { | Descriptor |
|---|---|
|   for( sizeId = 1; sizeId < 7; sizeId++ ) | |
|     for( matrixId = 0; matrixId < 6; matrixId ++ ) { | |
|       if( ! ( ( ( sizeId = = 1 ) && ( matrixId % 3 = = 0 ) ) || <br>       ( ( sizeId = = 6 ) && ( matrixId % 3 != 0 ) ) ) ) { | |
|         scaling_list_pred_mode_flag[ sizeId ][ matrixId ] | u(1) |
|         if( !scaling_list_pred_mode_flag[ sizeId ][ matrixId ] ) | |
|           scaling_list_pred_matrix_id_delta[ sizeId ][ matrixId ] | ue(v) |
|         else { | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = scaling_list_dc_coef_minus8[ sizeId − 4 ][ matrixId ] + 8 | |
|           } | |
|           for( i = 0; i < coefNum; i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !( sizeId = = 6 && x >= 4 && y >= 4 ) ) { | |
|               scaling_list_delta_coef | se(v) |
|               nextCoef = ( nextCoef + scaling_list_delta_coef + 256 ) % 256 | |
|               ScalingList[ sizeId ][ matrixId ][ i ] = nextCoef | |
|             } | |
|           } | |
|         } | |
|       } | |
|     } | |
| } | |

*Fig. 21*

7.3.2.16 Scaling list data syntax

| scaling_list_data( ) { | Descriptor |
|---|---|
|   for( sizeId = 1; sizeId <= MaxTbLog2SizeY; sizeId++ ) | |
|     for( matrixId = 0; matrixId < 6; matrixId ++ ) { | |
|       if( ! ( ( ( sizeId == 1 ) && ( matrixId % 3 == 0 ) ) \|\| <br>       ( ( sizeId == 6 ) && ( matrixId % 3 != 0 ) ) ) ) { | |
|         scaling_list_pred_mode_flag[ sizeId ][ matrixId ] | u(1) |
|         if( !scaling_list_pred_mode_flag[ sizeId ][ matrixId ] ) | |
|           scaling_list_pred_matrix_id_delta[ sizeId ][ matrixId ] | ue(v) |
|         else { | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = scaling_list_dc_coef_minus8[ sizeId − 4 ][ matrixId ] + 8 | |
|           } | |
|           for( i = 0; i < coefNum; i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !( sizeId == 6 && x >= 4 && y >= 4 ) ) { | |
|               scaling_list_delta_coef | se(v) |
|               nextCoef = ( nextCoef + scaling_list_delta_coef + 256 ) % 256 | |
|               ScalingList[ sizeId ][ matrixId ][ i ] = nextCoef | |
|             } | |
|           } | |
|         } | |
|       } | |
|     } | |
|   } | |
| } | |

*Fig. 22*

8.7.3 Scaling process for transform coefficients

Inputs to this process are:

- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)x(nTbH) array d of scaled transform coefficients with elements d[ x ][ y ].

The quantization parameter qP derivation process

...

The variable rectNonTsFlag is derived as follows:

$$\text{rectNonTsFlag} = ( ( ( \text{Log2}( \text{nTbW} ) + \text{Log2}( \text{nTbH} ) ) \, \& \, 1 ) == 1 \, \&\& \qquad (8\text{-}955)$$
$$\text{transform\_skip\_flag}[ \text{xTbY} ][ \text{yTbY} ] == 0 )$$

The variables bdShift, rectNorm and bdOffset are derived as follows:

$$\text{bdShift} = \text{bitDepth} + ( ( \text{rectNonTsFlag} \, ? \, 1 : 0 ) + \qquad (8\text{-}956)$$
$$( \text{Log2}( \text{nTbW} ) + \text{Log2}( \text{nTbH} ) ) / 2 ) - 5 + \text{dep\_quant\_enabled\_flag}$$

$$\text{bdOffset} = ( 1 << \text{bdShift} ) >> 1 \qquad (8\text{-}957)$$

The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

For the derivation of the scaled transform coefficients d[ x ][ y ] with x = 0..nTbW − 1, y = 0..nTbH − 1, the following applies:

- The intermediate scaling factor m[ x ][ y ] is derived as follows:
    - If one or more of the following conditions are true, m[ x ][ y ] is set equal to 16:
        - sps_scaling_list_enabled_flag is equal to 0.
        - transform_skip_flag[ xTbY ][ yTbY ] is equal to 1.
    - Otherwise, the following applies:

$$m[ x ][ y ] = \text{ScalingFactor}[ \text{Log2}( \text{nTbW} ) ][ \text{Log2}( \text{nTbH} ) ][ \text{matrixId} ][ x ][ y ],$$
        with matrixId as specified in Table 7-5 \qquad (8-958)

- The scaling factor ls[ x ][ y ] is derived as follows:
    - If dep_quant_enabled_flag is equal to 1, the following applies:

$$ls[ x ][ y ] = ( m[ x ][ y ] * \text{levelScale}[ \text{rectNonTsFlag} ][ (qP + 1) \% 6 ] ) << ( (qP + 1) / 6 ) \qquad (8\text{-}959)$$

- Otherwise (dep_quant_enabled_flag is equal to 0), the following applies:

$$ls[ x ][ y ] = ( m[ x ][ y ] * \text{levelScale}[ \text{rectNonTsFlag} ][ qP \% 6 ] ) << ( qP / 6 ) \qquad (8\text{-}960)$$

- When BdpcmFlag[ xTbY ][ yYbY ] is equal to 1, dz[ x ][ y ] is modified as follows:
    - If BdpcmDir[ xTbY ][ yYbY ] is equal to 0 and x is greater than 0, the following applies:

$$dz[ x ][ y ] = \text{Clip3}( \text{CoeffMin}, \text{CoeffMax}, dz[ x - 1 ][ y ] + dz[ x ][ y ] ) \qquad (8\text{-}961)$$

- Otherwise, if BdpcmDir[ xTbY ][ yYbY ] is equal to 1 and y is greater than 0, the following applies:

$$dz[ x ][ y ] = \text{Clip3}( \text{CoeffMin}, \text{CoeffMax}, dz[ x ][ y - 1 ] + dz[ x ][ y ] ) \qquad (8\text{-}962)$$

- The value dnc[ x ][ y ] is derived as follows:

$$dnc[ x ][ y ] = ( dz[ x ][ y ] * ls[ x ][ y ] + \text{bdOffset} ) >> \text{bdShift} \qquad (8\text{-}963)$$

- The scaled transform coefficient d[ x ][ y ] is derived as follows:

$$d[ x ][ y ] = \text{Clip3}( \text{CoeffMin}, \text{CoeffMax}, dnc[ x ][ y ] ) \qquad (8\text{-}964)$$

*Fig. 23*

8.7.3 Scaling process for transform coefficients

Inputs to this process are:
- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)x(nTbH) array d of scaled transform coefficients with elements d[ x ][ y ].

The quantization parameter qP derivation process

...

The variable rectNonTsFlag is derived as follows:

$$rectNonTsFlag = ( ( ( Log2( nTbW ) + Log2( nTbH ) ) \& 1 ) == 1 \&\& \qquad (8\text{-}955)$$
$$!( transform\_skip\_flag[ xTbY ][ yTbY ] \&\& cIdx == 0 ))$$

The variables bdShift, rectNorm and bdOffset are derived as follows:

$$bdShift = bitDepth + ( ( rectNonTsFlag ? 1 : 0 ) + \qquad (8\text{-}956)$$
$$( Log2( nTbW ) + Log2( nTbH ) ) / 2 ) - 5 + dep\_quant\_enabled\_flag$$

$$bdOffset = ( 1 << bdShift ) >> 1 \qquad (8\text{-}957)$$

The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

For the derivation of the scaled transform coefficients d[ x ][ y ] with x = 0..nTbW − 1, y = 0..nTbH − 1, the following applies:

- The intermediate scaling factor m[ x ][ y ] is derived as follows:
  - If one or more of the following conditions are true, m[ x ][ y ] is set equal to 16:
    - sps_scaling_list_enabled_flag is equal to 0.
    - transform_skip_flag[ xTbY ][ yTbY ] is equal to 1 and cIdx is equal to 0.
    - lfnst_idx[ xTbY ][ yTbY ] is not equal to 0 and both nTbW and nTbH are greater than or equal to 4.
  - Otherwise, the following applies:

$$m[ x ][ y ] = ScalingFactor[ Log2( nTbW ) ][ Log2( nTbH ) ][ matrixId ][ x ][ y ],$$
    $$\text{with matrixId as specified in Table 7-5} \qquad (8\text{-}958)$$

- The scaling factor ls[ x ][ y ] is derived as follows:
  - If dep_quant_enabled_flag is equal to 1, the following applies:

$$ls[ x ][ y ] = ( m[ x ][ y ] * levelScale[ rectNonTsFlag ][ (qP + 1) \% 6 ] ) << ( (qP + 1) / 6 ) \qquad (8\text{-}959)$$

- Otherwise (dep_quant_enabled_flag is equal to 0), the following applies:

$$ls[ x ][ y ] = ( m[ x ][ y ] * levelScale[ rectNonTsFlag ][ qP \% 6 ] ) << ( qP / 6 ) \qquad (8\text{-}960)$$

- When BdpcmFlag[ xTbY ][ yYbY ] is equal to 1, dz[ x ][ y ] is modified as follows:
  - If BdpcmDir[ xTbY ][ yYbY ] is equal to 0 and x is greater than 0, the following applies:

$$dz[ x ][ y ] = Clip3( CoeffMin, CoeffMax, dz[ x - 1 ][ y ] + dz[ x ][ y ]) \qquad (8\text{-}961)$$

- Otherwise, if BdpcmDir[ xTbY ][ yYbY ] is equal to 1 and y is greater than 0, the following applies:

$$dz[ x ][ y ] = Clip3( CoeffMin, CoeffMax, dz[ x ][ y - 1 ] + dz[ x ][ y ]) \qquad (8\text{-}962)$$

- The value dnc[ x ][ y ] is derived as follows:

$$dnc[ x ][ y ] = ( dz[ x ][ y ] * ls[ x ][ y ] + bdOffset ) >> bdShift \qquad (8\text{-}963)$$

- The scaled transform coefficient d[ x ][ y ] is derived as follows:

$$d[ x ][ y ] = Clip3( CoeffMin, CoeffMax, dnc[ x ][ y ]) \qquad (8\text{-}964)$$

2410 — (points to "If one or more of the following conditions are true...")
2420 — (points to "sps_scaling_list_enabled_flag is equal to 0.")
2430 — (points to "transform_skip_flag[ xTbY ][ yTbY ] is equal to 1 and cIdx is equal to 0.")

*Fig. 24*

8.7.3 Scaling process for transform coefficients

Inputs to this process are:
- a luma location ( xTbY, yTbY ) specifying the top-left sample of the current luma transform block relative to the top-left luma sample of the current picture,
- a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
- a variable nTbW specifying the transform block width,
- a variable nTbH specifying the transform block height,
- a variable predMode specifying the prediction mode of the coding unit,
- a variable cIdx specifying the colour component of the current block.

Output of this process is the (nTbW)x(nTbH) array d of scaled transform coefficients with elements d[ x ][ y ].

...

The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

The (nTbW)x(nTbH) array dz is set equal to the (nTbW)x(nTbH) array TransCoeffLevel[ xTbY ][ yTbY ][ cIdx ].

The variable lfnstEnabledFlag is derived as follows:
- If all of the following conditions are true, lfnstEnabledFlag is set equal to 1:
  - lfnst_idx[ xTbY ][ yTbY ] is not equal to 0.
  - Both nTbW and nTbH are greater than or equal to 4.
  - treeType is not equal to SINGLE_TREE or, treeType is equal to SINGLE_TREE and cIdx is equal to 0.
- Otherwise, lfnstEnabledFlag is set equal to 0.

For the derivation of the scaled transform coefficients d[ x ][ y ] with x = 0..nTbW − 1, y = 0..nTbH − 1, the following applies:
- The intermediate scaling factor m[ x ][ y ] is derived as follows:
  - If one or more of the following conditions are true, m[ x ][ y ] is set equal to 16:
    - sps_scaling_list_enabled_flag is equal to 0.
    - pic_scaling_list_present_flag is equal to 0.
    - transform_skip_flag[ xTbY ][ yTbY ][ cIdx ] is equal to 1.
    - scaling_matrix_for_lfnst_disabled_flag is equal to 1 and lfnstEnabledFlag is not equal to 0.
  - Otherwise, the following applies:

VIDEO SIGNAL PROCESSING METHOD AND APPARATUS USING SCALING PROCESS

CROSS-REFERENCE TO RELATED APPLICATIONS

This application is a continuation U.S. application Ser. No. 17/655,354, filed on Mar. 17, 2022, which is a continuation of PCT International Application No. PCT/KR2020/012706, which was filed on Sep. 21, 2020, and which claims priority under 35 U.S.C. 119(a) to Korean Patent Application No. 10-2019-0115656, filed with the Korean Intellectual Property Office on Sep. 19, 2019, and Korean Patent Application No. 10-2020-0003951, filed with the Korean Intellectual Property Office on Jan. 11, 2020. The disclosures of the above patent applications are incorporated herein by reference in their entirety.

TECHNICAL FIELD

The present invention relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

It is an aspect of the present disclosure to improve video signal coding efficiency.

Solution to Problem

In order to solve the above-mentioned problems, a video signal decoding method according to an embodiment of the present disclosure, which is a method for obtaining an intermediate scaling factor array (m[x][y]) for scaling a current block, may include, when a flag indicating whether a low frequency non-separable transform (LFNST) is applied indicates application of the low frequency non-separable transform to a current block and a scaling factor array non-use flag indicates non-use of a scaling matrix for the current block, configuring all factors included in an intermediate scaling factor array to be one pre-determined value, scaling a transform coefficient for the current block based on the intermediate scaling factor array, when the flag indicating whether a low frequency non-separable transform is applied indicates application of the low frequency non-separable transform to the current block, obtaining a residual for the current block by applying an inverse transform of the low frequency non-separable transform and an inverse transform of a primary transform to the scaled transform coefficient, wherein the primary transform is a transform applied to a residual signal of a spatial domain before the low frequency non-separable transform, when the flag indicating whether the low frequency non-separable transform is applied indicates that the low frequency non-separable transform is not applied to the current block, obtaining a residual for the current block by applying an inverse transform of the primary transform to the scaled transform coefficient, and reconstructing the current block based on the residual and a predictor of the current block.

In a video signal decoding method according to an embodiment of the present disclosure, when the flag indicating whether the low frequency non-separable transform is applied indicates application of the low frequency non-separable transform to the current block, the predictor of the current block may be obtained by intra prediction.

A video signal decoding method according to an embodiment of the present disclosure may further include determining the flag indicating whether the low frequency non-separable transform is applied based on a low frequency non-separable transform index, wherein the low frequency non-separable transform index indicates whether the low frequency non-separable transform is applied and a kernel to be used for the low frequency non-separable transform.

A video signal decoding method according to an embodiment of the present disclosure may further include when the flag indicating whether the low frequency non-separable transform is applied indicates that the low frequency non-separable transform is not applied to the current block or the scaling factor array non-use flag indicates that a scaling matrix is used for the current block, and when the flag indicating whether transform is applied to the current block indicates that transform is not applied, configuring all factors included in the intermediate scaling factor array to be one predetermined value.

A video signal decoding method according to an embodiment of the present disclosure may further include deriving the intermediate scaling factor array based on values obtained from a bitstream when failing to configure all factors included in the intermediate scaling factor array to the one predetermined value.

In a video signal decoding method according to an embodiment of the present disclosure, the scaling factor array non-use flag may be obtained from at least one bitstream among a sequence parameter set (SPS), a picture parameter set (PPS), a picture header, and a slice header.

A video signal decoding method according to an embodiment of the present disclosure may further include determining the flag indicating whether the low frequency non-separable transform is applied further based on information indicating the type of a tree currently being processed.

In a video signal decoding method according to an embodiment of the present disclosure, the determining the flag indicating whether the low frequency non-separable transform is applied includes determining whether the information indicating the type of the tree currently being processed is SINGLE_TREE or DUAL_TREE_LUMA, determining whether the low frequency non-separable transform index is 0 when the information indicating the type of the tree currently being processed is SINGLE_TREE or DUAL_TREE_LUMA, when the low frequency non-separable transform index is not 0, configuring the flag indicating whether the low frequency non-separable transform is applied to a luma component of the current block is applied to indicate that the low frequency non-separable transform is applied, and when the low frequency non-separable transform index is 0, configuring the flag indicating whether the low frequency non-separable transform is applied to a luma component of the current block is applied to indicate that the low frequency non-separable transform is not applied, and the SINGLE_TREE indicates that a single tree is used in partitioning a higher region including the current block, and the DUAL_TREE_LUMA indicates that a dual tree is used in partitioning the higher region including the current block and indicates that a component related to the current block is a luma component.

In a video signal decoding method according to an embodiment of the present disclosure, when the information indicating the type of the tree currently being processed is SINGLE_TREE, the current block may include a luma component.

In a video signal decoding method according to an embodiment of the present disclosure, the determining the flag indicating whether the low frequency non-separable transform is applied includes when the information indicating the type of the tree currently being processed is DUAL_TREE_CHROMA and the low frequency non-separable transform index is not 0, configuring the flag indicating whether the low frequency non-separable transform is applied to a chroma component of the current block is applied to indicate that the low frequency non-separable transform is applied, and when the information indicating the type of the tree currently being processed is not DUAL_TREE_CHROMA or the low frequency non-separable transform index is 0, configuring the flag indicating whether the low frequency non-separable transform is applied to a chroma component of the current block is applied to indicate that the low frequency non-separable transform is not applied, and the DUAL_TREE_CHROMA indicates that a dual tree is used in partitioning a higher region including the current block, and indicates that a component related to the current block is a chroma component.

In a video signal decoding method according to an embodiment of the present disclosure, the one predetermined value may be $2^{-4}N$, and N may be a natural number.

In a video signal decoding method according to an embodiment of the present disclosure, the one predetermined value may be 16.

A video signal processing apparatus according to an embodiment of the present disclosure, which is a video signal processing apparatus for obtaining an intermediate scaling factor array m[x][y], may include a processor and a memory, wherein the processor is configured, based on instructions stored in the memory, to, when a flag indicating whether a low frequency non-separable transform (LFNST) is applied indicates application of the low frequency non-separable transform to a current block and a scaling factor array non-use flag indicates non-use of a scaling matrix for the current block, configure all factors included in an intermediate scaling factor array to be one pre-determined value, scale a transform coefficient for the current block based on the intermediate scaling factor array, when the flag indicating whether a low frequency non-separable transform is applied indicates application of the low frequency non-separable transform to the current block, obtain a residual for the current block by applying an inverse transform of the low frequency non-separable transform and an inverse transform of a primary transform to the scaled transform coefficient, wherein the primary transform is a transform applied to a residual signal of a spatial domain before the low frequency non-separable transform, when the flag indicating whether the low frequency non-separable transform is applied indicates that the low frequency non-separable transform is not applied to the current block, obtain a residual for the current block by applying an inverse transform of the primary transform to the scaled transform coefficient, and reconstruct the current block based on the residual and a predictor of the current block.

In a video signal processing apparatus according to an embodiment of the present disclosure, when the flag indicating whether the low frequency non-separable transform is applied indicates application of the low frequency non-separable transform to the current block, the predictor of the current block may be obtained by intra prediction.

In a video signal processing apparatus according to an embodiment of the present disclosure, the processor may be configured, based on instructions stored in the memory, to determine a flag indicating whether the low frequency non-separable transform is applied based on a low frequency non-separable transform index, wherein the low frequency non-separable transform index indicates whether the low frequency non-separable transform is applied and a kernel to be used for the low frequency non-separable transform.

In a video signal processing apparatus according to an embodiment of the present disclosure, the processor may be configured, based on instructions stored in the memory, to configure all factors included in the intermediate scaling factor array to be one predetermined value when the flag indicating whether transform is applied to the current block indicates that transform is not applied thereto, in case that the flag indicating whether the low frequency non-separable transform is applied indicates that the low frequency non-separable transform is not applied to the current block or the scaling factor array non-use flag indicates that a scaling matrix is used for the current block.

In a video signal processing apparatus according to an embodiment of the present disclosure, the processor may be configured, based on instructions stored in the memory, to derive the intermediate scaling factor array based on values obtained from a bitstream when failing to configure all factors included in the intermediate scaling factor array to the one predetermined value.

In a video signal processing apparatus according to an embodiment of the present disclosure, the processor may be configured, based on instructions stored in the memory, to acquire the scaling factor array non-use flag from at least one bitstream among a sequence parameter set (SPS), a picture parameter set (PPS), a picture header, and a slice header.

In a video signal processing apparatus according to an embodiment of the present disclosure, the processor may be configured, based on instructions stored in the memory, to determine the flag indicating whether the low frequency non-separable transform is applied further based on information indicating the type of a tree currently being processed.

In a video signal processing apparatus according to an embodiment of the present disclosure, the processor may be configured, based on instructions stored in the memory, to determine whether the information indicating the type of the tree currently being processed is SINGLE_TREE or DUAL_TREE_LUMA, determine whether the low frequency non-separable transform index is 0 when the information indicating the type of the tree currently being processed is SINGLE_TREE or DUAL_TREE_LUMA, when the low frequency non-separable transform index is not 0, configure the flag indicating whether the low frequency non-separable transform is applied to a luma component of the current block is applied to indicate that the low frequency non-separable transform is applied, and when the low frequency non-separable transform index is 0, configure the flag indicating whether the low frequency non-separable transform is applied to a luma component of the current block is applied to indicate that the low frequency non-separable transform is not applied, and the SINGLE_TREE indicates that a single tree is used in partitioning a higher region including the current block, and the DUAL_TREE_LUMA indicates that a dual tree is used in partitioning the higher region including the current block and indicates that a component related to the current block is a luma component.

In a video signal processing apparatus according to an embodiment of the present disclosure, when the information indicating the type of the tree currently being processed is SINGLE_TREE, the current block may include a luma component.

In a video signal processing apparatus according to an embodiment of the present disclosure, the processor may be configured, based on instructions stored in the memory, to when the information indicating the type of the tree currently being processed is DUAL_TREE_CHROMA and the low frequency non-separable transform index is not 0, configure the flag indicating whether the low frequency non-separable transform is applied to a chroma component of the current block is applied to indicate that the low frequency non-separable transform is applied, and when the information indicating the type of the tree currently being processed is not DUAL_TREE_CHROMA or the low frequency non-separable transform index is 0, configure the flag indicating whether the low frequency non-separable transform is applied to a chroma component of the current block is applied to indicate that the low frequency non-separable transform is not applied, and the DUAL_TREE_CHROMA indicates that a dual tree is used in partitioning a higher region including the current block, and indicates that a component related to the current block is a chroma component.

In a video signal processing apparatus according to an embodiment of the present disclosure, the one predetermined value may be $2^4 N$, and N may be a natural number.

In a video signal processing apparatus according to an embodiment of the present disclosure, the one predetermined value may be 16.

A method for encoding a video signal according to an embodiment of the present disclosure includes, when a flag indicating whether a low frequency non-separable transform (LFNST) is applied indicates application of the low frequency non-separable transform to a current block and a scaling factor array non-use flag indicates non-use of a scaling matrix for the current block, configuring all factors included in an intermediate scaling factor array to be one pre-determined value, generating a residual for the current block based on an original of the current block and a predictor of the current block, when the flag indicating whether the low frequency non-separable transform is applied indicates application of the low frequency non-separable transform to the current block, obtaining a transform coefficient for the current block by applying a primary transform and the low frequency non-separable transform to the residual, wherein the primary transform is a transform applied to a residual signal of a spatial domain before the low frequency non-separable transform, when the flag indicating whether the low frequency non-separable transform is applied indicates that the low frequency non-separable transform is not applied to the current block, obtaining a transform coefficient for the current block by applying the primary transform to the residual, scaling the transform coefficient based on the intermediate scaling factor array, and generating a bitstream based on the scaled transform coefficient.

A video signal processing apparatus according to an embodiment of the present disclosure includes a processor and a memory, wherein the processor is configured, based on the instructions stored in the memory, to, when a flag indicating whether a low frequency non-separable transform (LFNST) is applied indicates application of the low frequency non-separable transform to a current block and a scaling factor array non-use flag indicates non-use of a scaling matrix for the current block, configuring all factors included in an intermediate scaling factor array to be one pre-determined value, generating a residual for the current block based on an original of the current block and a predictor of the current block, when the flag indicating whether the low frequency non-separable transform is applied indicates application of the low frequency non-separable transform to the current block, obtaining a transform coefficient for the current block by applying a primary transform and the low frequency non-separable transform to the residual, wherein the primary transform is a transform applied to a residual signal of a spatial domain before the low frequency non-separable transform, when the flag indicating whether the low frequency non-separable transform is applied indicates that the low frequency non-separable transform is not applied to the current block, obtaining a transform coefficient for the current block by applying the primary transform to the residual, scaling the transform coefficient based on the intermediate scaling factor array, and generating a bitstream based on the scaled transform coefficient.

According to an embodiment of the present disclosure, a non-transitory computer-readable recording medium stores a bitstream for reconstruction of a current block, the bitstream includes a low frequency non-separable transform index, a scaling factor array non-use flag, and a scaled transform coefficient, and the scaled transform coefficient is generated by, when a flag indicating whether a low frequency non-separable transform (LFNST) is applied based on the low frequency non-separable transform index indicates application of the low frequency non-separable transform to a current block and the scaling factor array non-use flag indicates non-use of a scaling matrix for the current block, configuring all factors included in an intermediate scaling factor array to be one pre-determined value, generating a residual for the current block based on the original of the current block and a predictor of the current block, when the flag indicating whether the low frequency non-separable transform is applied indicates application of the low frequency non-separable transform to the current block, obtaining a transform coefficient for the current block by applying a primary transform and the low frequency non-separable transform to the residual, wherein the primary transform is a transform applied to a residual signal of a spatial domain before the low frequency non-separable transform, when the flag indicating whether the low frequency non-separable transform is applied indicates that the low frequency non-separable transform is not applied to the current block, obtaining a transform coefficient for the current block by applying the primary transform to the residual, and scaling the transform coefficient based on the intermediate scaling factor array.

Advantageous Effects of Invention

According to an embodiment of the present disclosure, video signal coding efficiency may be improved.

BRIEF DESCRIPTION OF DRAWINGS

FIG. 8 is a diagram specifically illustrating a method for acquiring a residual signal by inverse transforming a transform coefficient by an encoder and a decoder.

FIG. 9 illustrates a basis function corresponding to each transform type.

FIG. 12 illustrates a method of configuring a transform candidate set according to a prediction mode of a current block.

FIG. 13 illustrates a horizontal transform kernel and a vertical transform kernel determined according to a set index.

FIG. 16 illustrates a method for determining an up-right diagonal scan order.

FIG. 17 illustrates an up-right diagonal scan order defined in FIG. 16 according to block size.

FIG. 18 illustrates an adaptation parameter set (APS) syntax structure.

FIG. 19 illustrates a slice header syntax structure.

FIG. 20 illustrates parameters used in a scaling list data syntax structure.

FIG. 21 illustrates a scaling list data syntax structure.

FIG. 22 illustrates a scaling list data syntax structure considering the maximum size of a luma transform block.

FIG. 23 illustrates a scaling process applied to transform coefficients.

FIG. 24 illustrates a scaling process applied to transform coefficients according to another embodiment of the present disclosure.

FIG. 25 illustrates a scaling process applied to transform coefficients according to another embodiment of the present disclosure.

BEST MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including at least one a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
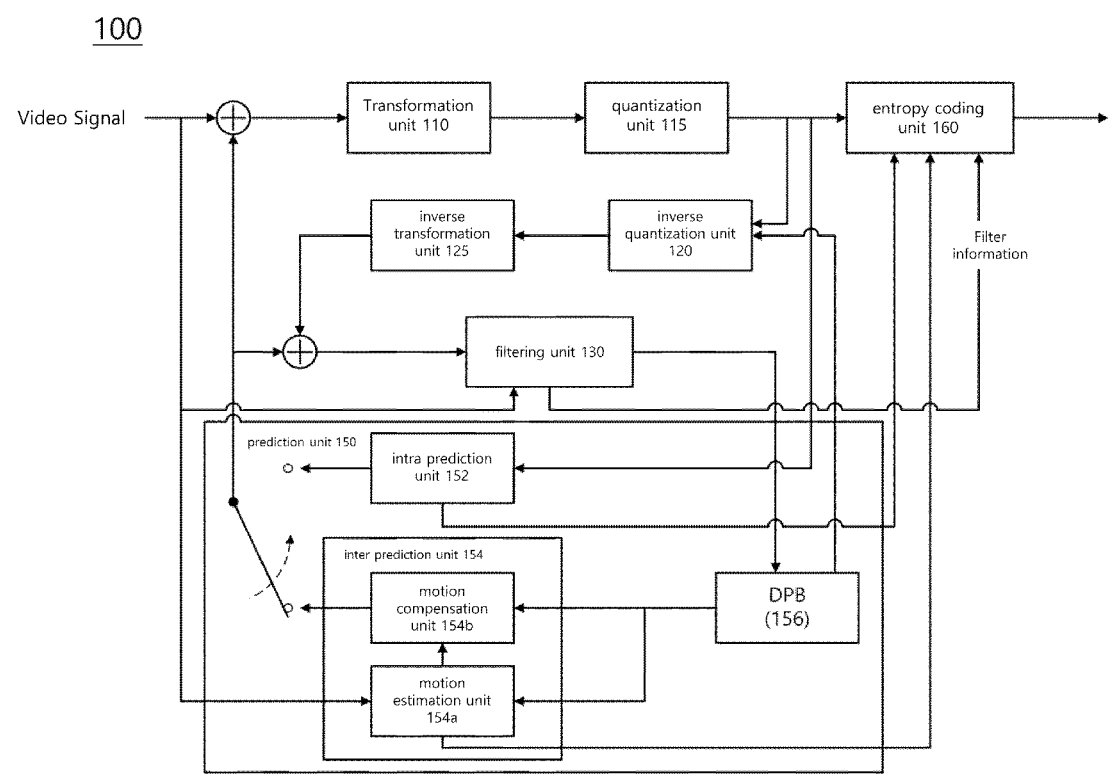
FIG. 1 is a schematic block diagram of a video signal encoding apparatus according to an embodiment of the present invention.

FIG. 1 is a schematic block diagram of a video signal encoding apparatus 100 according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes(scaling) the value of the transform coefficient, and the inverse transformation unit 125 reconstructs the residual value using the inverse quantized(scaling) transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to increase coding efficiency, instead of coding a picture signal as it is, a method for acquiring a reconstructed picture is used in which a picture is predicted using a region that has been already coded through the prediction unit 150, and a residual value between the original picture and the predicted picture is added to the predicted picture. An intra prediction unit 152 performs intra prediction within the current picture, and an inter prediction unit 154 predicts the current picture by using a reference picture stored in the decoded picture buffer 156. The intra prediction unit 152 performs intra prediction from reconstructed regions in the current picture, and transmits intra encoding information to an entropy coding unit 160. Again, the inter prediction unit 154 may include a motion estimation unit 154a and a motion compensation unit 154b. The motion estimation unit 154a obtains a motion vector value of the current region by referring to the reconstructed specific region. The motion estimation unit 154a may transmit position information (reference frame, motion vector, or the like) of the reference region to the entropy coding unit 160 to be included in the bitstream. The motion compensation unit 154b performs inter-motion compensation using the motion vector value transmitted from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The intra encoding information may include information on the reference sample. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information set (reference picture index, motion vector information, etc.) on the reference region to the entropy coding unit 160. The motion compensation unit 154b performs motion compensation using the motion vector value transmitted from the motion estimation unit 154a. The inter prediction unit 154 transmits inter encoding information including motion information on a reference region to the entropy coding unit 160.

According to an additional embodiment, the prediction unit 150 may include an intra block copy (BC) prediction unit (not illustrated). The intra BC prediction unit performs intra BC prediction from reconstructed samples in the current picture, and transmits intra BC encoding information to an entropy coding unit 160. The intra BC prediction unit refers to a specific region in the current picture and obtains a block vector value indicating a reference region to be used for prediction of the current region. The intra BC prediction unit may perform intra BC prediction using the obtained block vector value. The intra BC prediction unit transmits the intra BC encoding information to the entropy coding unit 160. The intra BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients information, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used. For example, the entropy coding unit 160 may binarize information representing a quantized transform coefficient. In addition, the entropy coding unit 160 may generate a bitstream by arithmetic coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

The encoding apparatus 100 may transmit the generated bitstream to a decoding apparatus 200. Further, the decoding apparatus 200 may receive a bitstream. As such, transmission of the bitstream, which is generated by the encoding apparatus 100, to the decoding apparatus 200 is referred to as "signaling".

Figure 2:
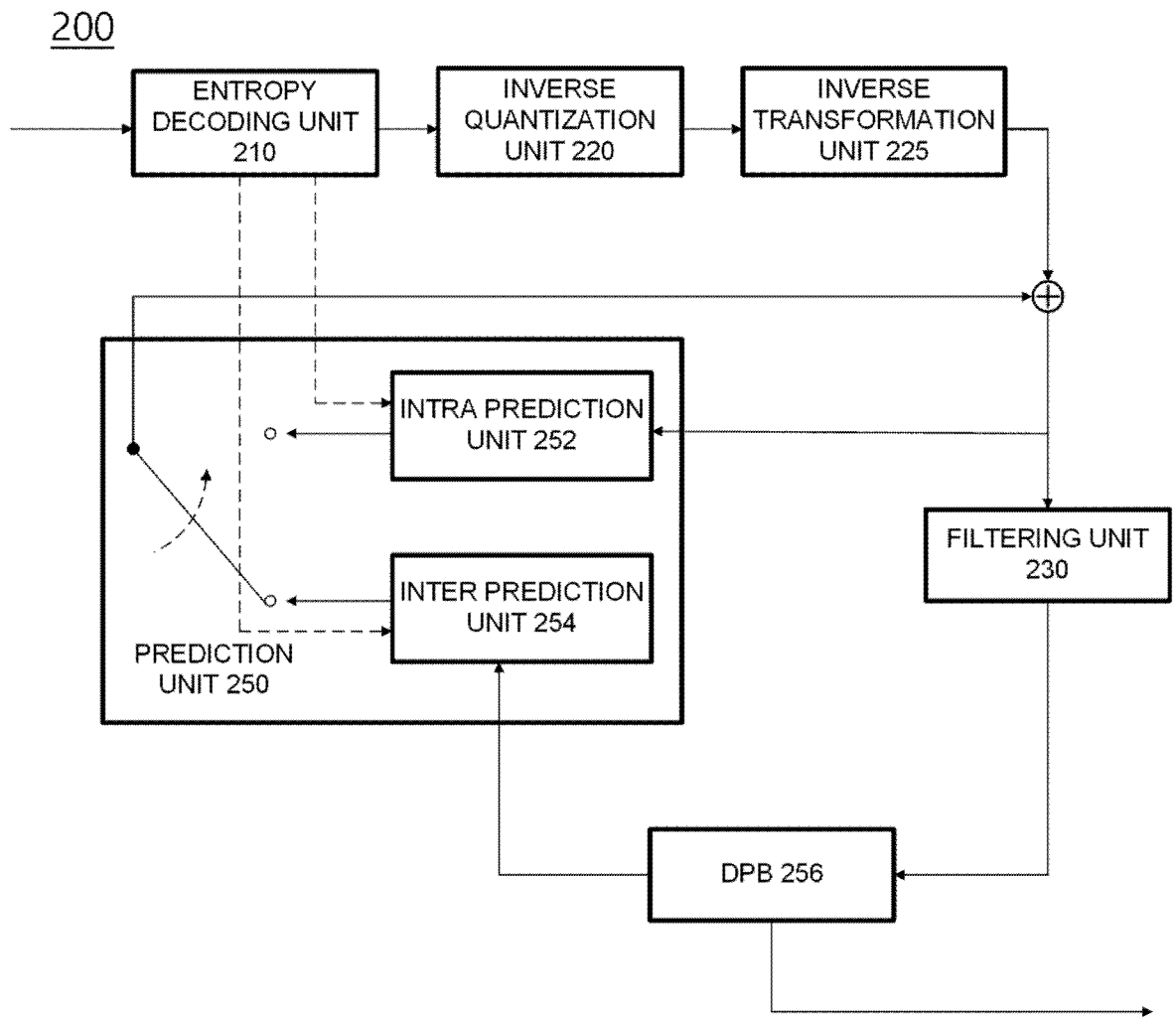
FIG. 2 is a schematic block diagram of a video signal decoding apparatus according to an embodiment of the present invention.

FIG. 2 is a schematic block diagram of a video signal decoding apparatus 200 according to an embodiment of the present disclosure. Referring to FIG. 2, the decoding apparatus 200 of the present disclosure includes an entropy decoding unit 210, a dequantization unit 220, an inverse transform unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binary code for transform coefficient information of a specific region from the video signal bitstream. Further, the entropy decoding unit 210 obtains a quantized transform coefficient by inverse-binarizing a binary code. The dequantization unit 220 dequantizes the quantized transform coefficient. The dequantization may correspond to scaling. The inverse transform unit 225 reconstructs a residual value by using the dequantized transform coefficient. The inverse transform unit 225 may acquire a residual by inverse transforming the dequantized transform coefficient. The video signal processing device 200 reconstructs an original pixel value by summing the residual value obtained by the inverse transform unit 225 with a prediction value obtained by the prediction unit 250. Here, the prediction value obtained by the prediction unit 250 may be a predictor.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. A picture (or tile/slice) using only the current picture for reconstruction, that is, performing intra prediction or intra BC prediction is referred to as an intra picture or I picture (or tile/slice), and a picture (or tile/slice) performing all of intra prediction, inter prediction, and intra BC prediction is referred to as an inter picture (or tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and restored samples in the current picture. As described above, the intra encoding information may include at least one of an intra prediction mode, a Most Probable Mode (MPM) flag, and an MPM index. The intra prediction unit 252 predicts the sample values of the current block by using the restored samples located on the left and/or upper side of the current block as reference samples. In this disclosure, restored samples, reference samples, and samples of the current block may represent pixels. Also, sample values may represent pixel values.

According to an embodiment, the reference samples may be samples included in a neighboring block of the current block. For example, the reference samples may be samples adjacent to the left boundary of the current block and/or samples adjacent to the upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in a bi-prediction scheme may be regions selected from each of an L0 picture list and an L1 picture list.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not illustrated). The intra BC prediction unit may reconstruct the current region by referring to a specific region including reconstructed samples in the current picture. The intra BC prediction unit obtains intra BC encoding information on the current region from the entropy decoding unit 210. The intra BC prediction unit obtains a block vector value of the current region indicating a specific region in the current picture. The intra BC prediction unit may perform intra BC prediction using the obtained block vector value. The intra BC encoding information may include block vector information.

The reconstructed video picture is generated by adding the prediction value(predictor) outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
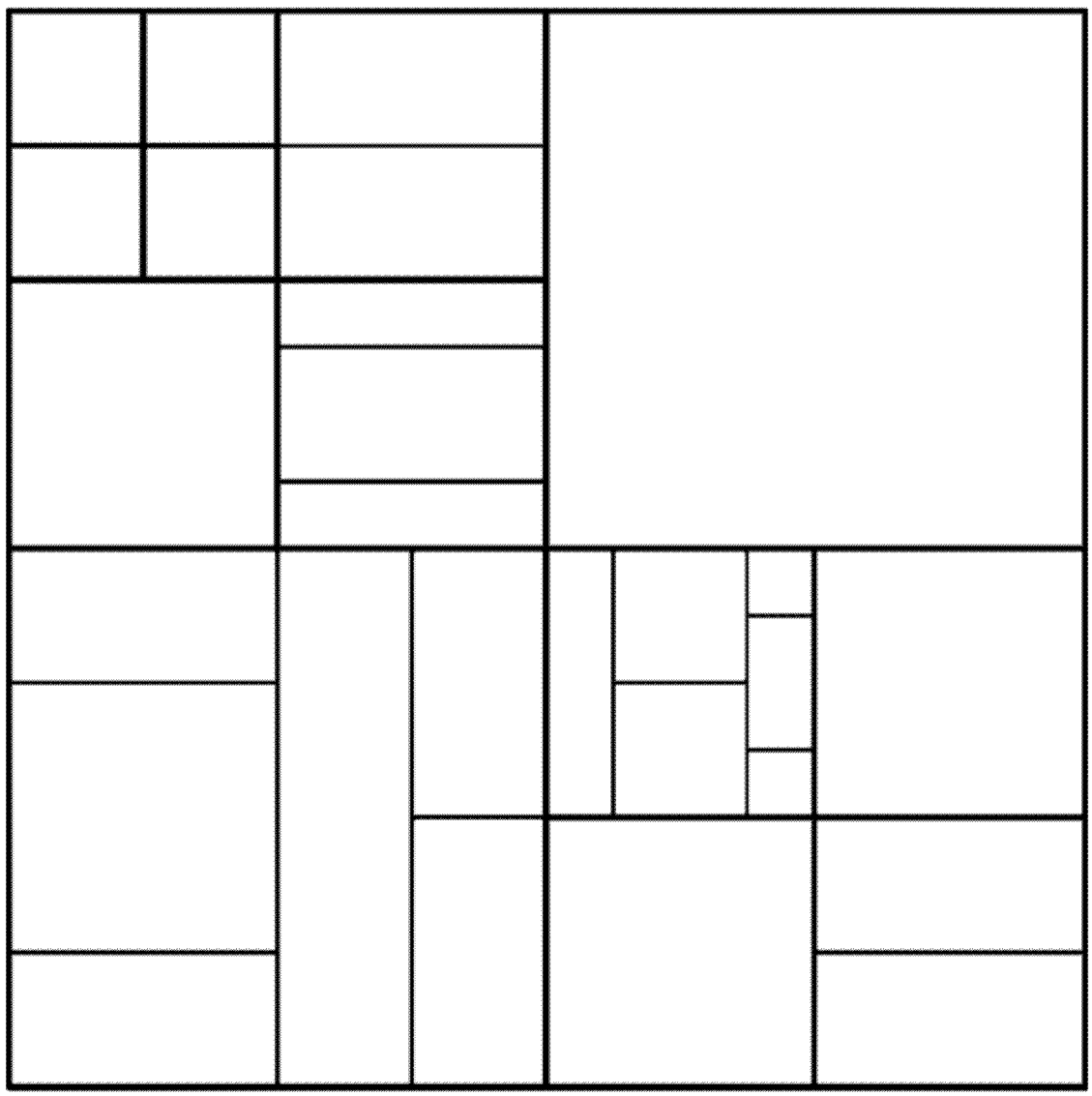
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type-tree may be a coding unit. If splitting for the coding unit is not indicated or the coding unit is not large compared to the maximum transform length, the coding unit is used as a unit of prediction and transform without further splitting. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
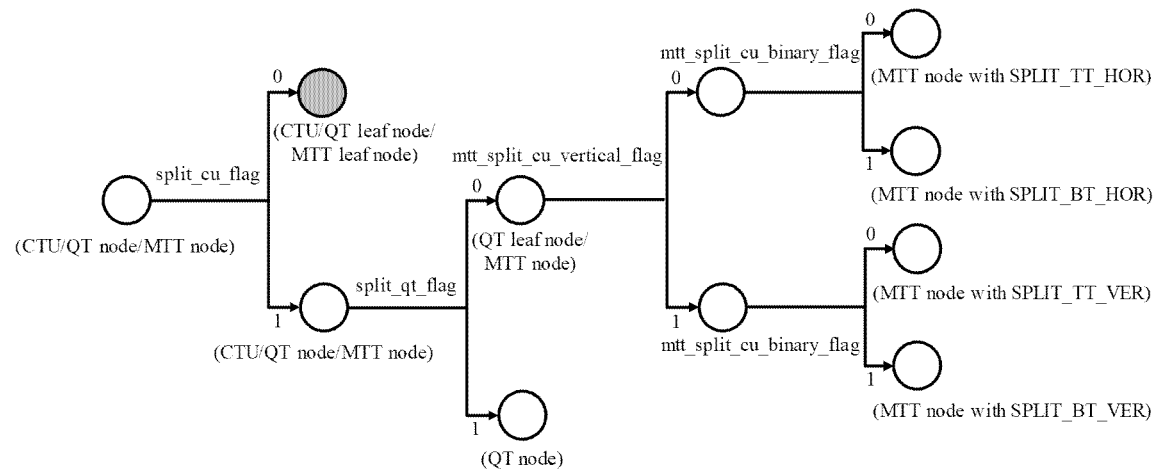
FIG. 4 shows an embodiment of a method for signaling a division of a quad tree and a multi-type tree.

FIG. 4 illustrates an embodiment of a method for signaling a quad tree and multi-type tree split. Preset flags may be used to signal the quad tree and multi-type tree split described above. With reference to FIG. 4, at least one of a flag 'split_cu_flag' indicating whether or not a node is split, a flag 'split_qt_flag' indicating whether or not a quad tree node is split, a flag 'mtt_split_cu_vertical_flag' indicating a split direction of the multi-type tree node, or a flag 'mtt_split_cu_binary_flag' indicating the split shape of the multi-type tree node may be used.

According to an embodiment of the present invention, 'split_cu_flag', which is a flag indicating whether or not the current node is split, may be signaled first. When the value of 'split_cu_flag' is 0, it indicates that the current node is not split, and the current node becomes a coding unit. When the current node is a coding tree unit, the coding tree unit includes one non-split coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes a coding unit.

When the value of 'split_cu_flag' is 1, the current node may be split into nodes of a quad tree or a multi-type tree according to the value of 'split_qt_flag'. The coding tree unit is a root node of a quad tree, and may be first split into a quad tree structure. In the quad-tree structure, 'split_qt_flag' is signaled for each node 'QT node'. When the value of 'split_qt_flag' is 1, the node is split into 4 square nodes, and when the value of 'split_qt_flag' is 0, the node becomes the leaf node of the quad tree 'QT leaf node', and the node is split into multi-type tree nodes. According to an embodiment of the present invention, the quad-tree split may be limited according to the type of the current node. When the current node is a coding tree unit (root node of the quad tree) or a quad tree node, quad-tree split may be allowed, and when the current node is a multi-type tree node, the quad tree split may not be allowed.

Each quad tree leaf node 'QT leaf node' may be further split into multi-type tree structures. As described above, when 'split_qt_flag' is 0, the current node may be split into multi-type nodes. In order to indicate the split direction and split shape, 'mtt_split_cu_vertical_flag' and 'mtt_split_cu_binary_flag' may be signaled. When the value of 'mtt_split_cu_vertical_flag' is 1, the vertical split of the node 'MTT node' is indicated, and when the value of 'mtt_split_cu_vertical_flag' is 0, the horizontal split of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

Picture prediction (motion compensation) for coding is performed on coding units that are no longer split (that is, leaf nodes of the coding unit tree). The basic unit that performs such prediction is hereinafter referred to as a prediction unit or a prediction block.

Hereinafter, the term unit used in the present specification may be used as a term for replacing the prediction unit, which is a basic unit for performing prediction. However, the present invention is not limited thereto, and may be more broadly understood as a concept including the coding unit.

Figure 5:
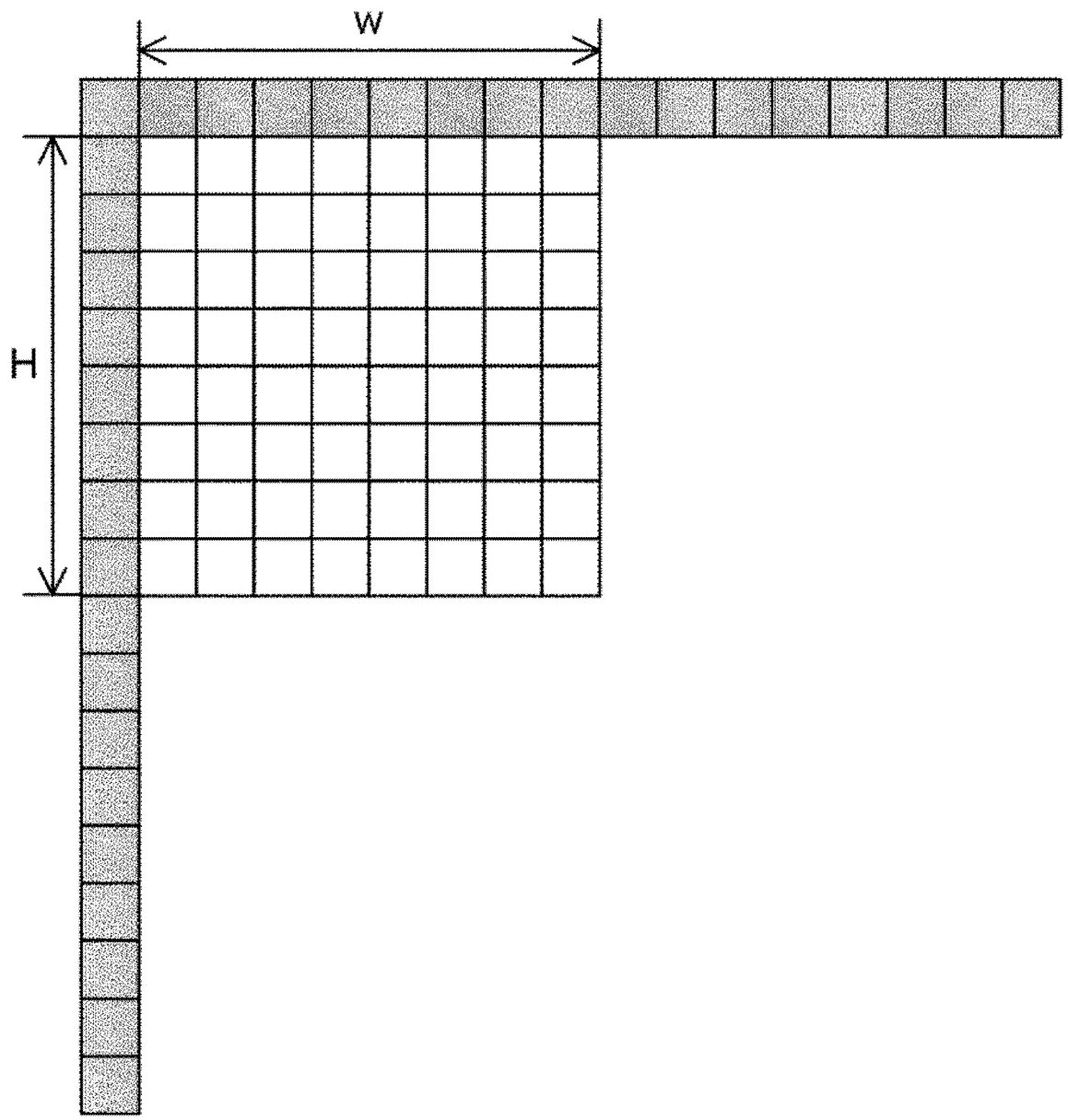
FIGS. 5 and 6 more specifically illustrate an intra prediction method according to an embodiment of the present invention.
Figure 6:
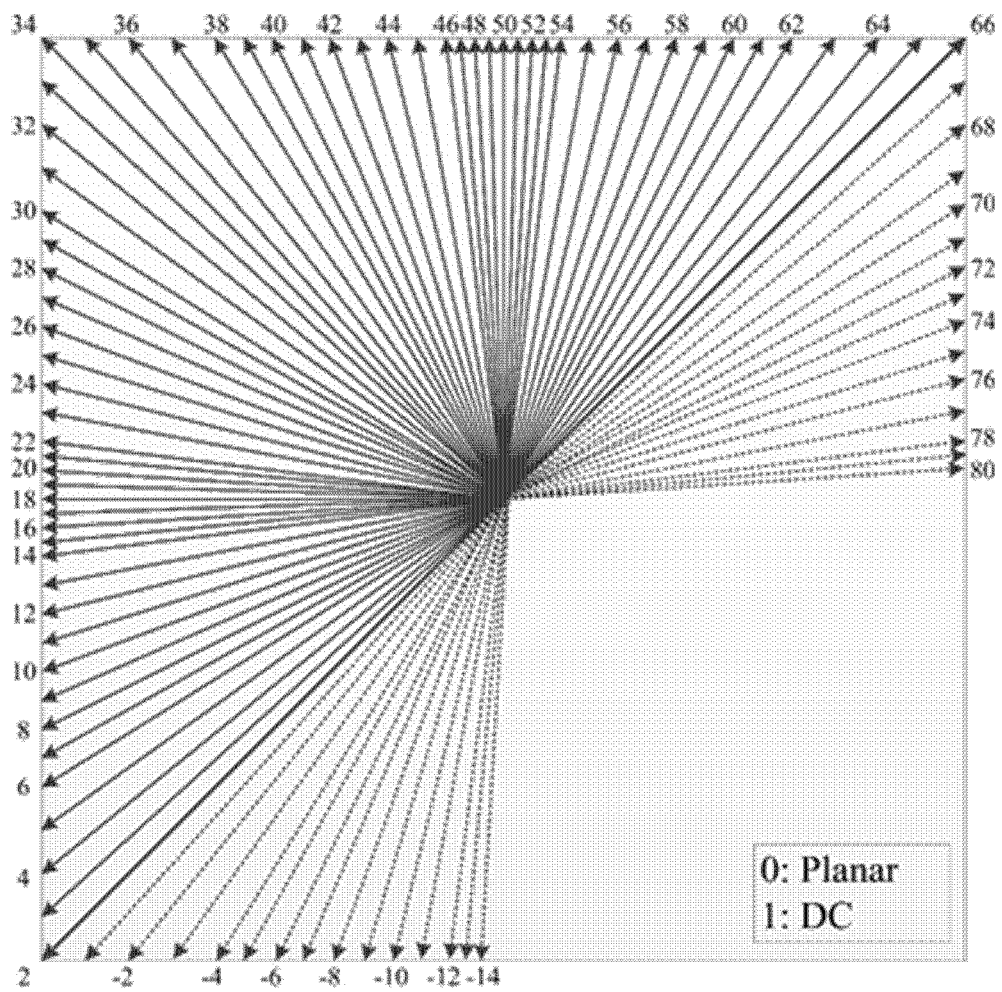

FIGS. 5 and 6 more specifically illustrate an intra prediction method according to an embodiment of the present invention. As described above, the intra prediction unit predicts the sample values of the current block by using the restored samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

In addition, if at least some of the samples to be used as reference samples have not been restored, the intra prediction unit may obtain a reference sample by performing a reference sample padding process. In addition, the intra prediction unit may perform a reference sample filtering process to reduce errors in intra prediction. That is, performing filtering on surrounding samples and/or reference samples obtained by a reference sample padding process may be performed to obtain filtered reference samples. The intra prediction unit predicts the samples of the current block using the reference samples thus obtained. The intra prediction unit predicts samples of the current block by using reference samples that have not been filtered or reference samples that have been filtered. In the present disclosure, surrounding samples may include samples on at least one reference line. For example, the surrounding samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

On the other hand, in order to increase coding efficiency, instead of coding the residual signal described above as it is, a method in which a transform coefficient value obtained by transforming the residual signal is quantized and the quantized transform coefficient is coded may be used. As described above, the transform unit may obtain a transform coefficient value by transforming the residual signal. In this case, the residual signal of a specific block may be distributed over the entire region of the current block. Accordingly, it is possible to improve coding efficiency by concentrating energy in the low frequency domain through frequency domain transform on the residual signal. Hereinafter, a method for transforming or inversely transforming a residual signal will be described in detail.

Figure 7:
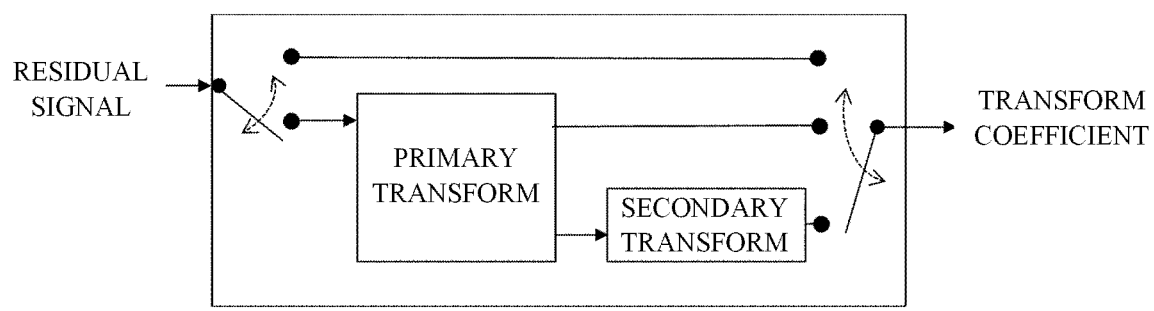
FIG. 7 is a diagram specifically illustrating a method for transforming a residual signal by an encoder.

FIG. 7 is a diagram specifically illustrating a method for transforming a residual signal by an encoder. As described above, the residual signal in a spatial domain may be transformed to a frequency domain. The encoder may obtain a transform coefficient by transforming the obtained residual signal. First, the encoder may acquire at least one residual block including a residual signal for the current block. The residual block may be any one of the current block or blocks into which the current block is divided. In the present disclosure, the residual block may be referred to as a residual array or a residual matrix including residual samples of the current block. In addition, in the present disclosure, the residual block may represent a transform unit or a block having the same size as the size of the transform block.

Next, the encoder may transform the residual block using a transform kernel. The transform kernel used for transforming the residual block may be a transform kernel having separable characteristics into a vertical transform and a horizontal transform. In this case, the transform on the residual block may be separable into the vertical transform and the horizontal transform. For example, the encoder may perform the vertical transform by applying a transform kernel in the vertical direction of the residual block. In addition, the encoder may perform the horizontal transform by applying a transform kernel in the horizontal direction of the residual block. In the present disclosure, the transform kernel may be used as a term to refer to a parameter set used for transforming the residual signal such as transform matrix, transform array, and transform function. According to an embodiment, the transform kernel may be any one of a plurality of available kernels. Further, a transform kernel based on different transform types may be used for each of the vertical transform and the horizontal transform. A method for selecting one of multiple available transform kernels will be described later with reference to FIGS. 12 to 13.

The encoder may transmit a transform block transformed from the residual block to a quantization unit to quantize it. In this case, the transform block may include a plurality of transform coefficients. Specifically, the transform block may be composed of a plurality of transform coefficients arranged in two dimensions. Like the residual block, the size of the transform block may be the same as that of any one of the current block or the block into which the current block is divided. The transform coefficients transferred to the quantization unit may be expressed as quantized values.

In addition, the encoder may perform an additional transform before the transform coefficient is quantized. As illustrated in FIG. 7, the above-described transform method may be referred to as a primary transform, and an additional transform may be referred to as a secondary transform. The secondary transform may be selective for each residual block. According to an embodiment, the encoder may improve coding efficiency by performing the secondary transform on a region where it is difficult to concentrate energy in a low-frequency domain only by the primary transform. For example, the secondary transform may be added to a block in which residual values appear relatively large in a direction other than the horizontal or vertical direction of the residual block. The residual values of the intra-predicted block may have a relatively high probability of changing in a direction other than the horizontal or vertical direction compared to the residual values of the inter-predicted block. Accordingly, the encoder may additionally perform the secondary transform on the residual signal of the intra-predicted block. In addition, the encoder may omit the secondary transform on the residual signal of the inter-predicted block.

For another example, whether to perform the secondary transform may be determined according to the size of the current block or the residual block. In addition, transform kernels having different sizes may be used according to the size of the current block or the residual block. For example, a 8×8 secondary transform may be applied to a block in which the shorter side of the width or height is equal to or greater than a first preset length. In addition, a 4×4 secondary transform may be applied to a block in which the shorter side of the width or height is equal to or greater than a second preset length and smaller than the first preset length. In this case, the first preset length may be a value greater than the second preset length; however, the present disclosure is not limited thereto. Furthermore, unlike the primary transform, the secondary transform may not be separable into the vertical transform and the horizontal transform. This secondary transform may be referred to as a low frequency non-separable transform (LFNST).

In addition, in the case of a video signal in a specific region, energy in a high frequency band may not be reduced even when a frequency transform is performed due to a sudden change in brightness. Accordingly, the performance of compaction performance due to quantization may deteriorate. In addition, when a transform is performed on a region in which the residual value rarely exists, encoding time and decoding time may unnecessarily increase. Accordingly, the transform on the residual signal of the specific region may be omitted. Whether to perform the transform on the residual signal of the specific region may be determined by a syntax element related to the transform of the specific region. For example, the syntax element may include transform skip information. The transform skip information may be a transform skip flag. When the transform skip information on the residual block indicates transform skip, the transform on the residual block is not performed. In this case, the encoder may immediately quantize the residual signal on which the transform of the region has not been performed. The operations of the encoder described with reference to FIG. 7 may be performed through the transform unit of FIG. 1.

The above-described syntax elements related to the transform may be information parsed from a video signal bitstream. The decoder may entropy decode the video signal bitstream to obtain the syntax elements related to the transform. In addition, the encoder may generate a video signal bitstream by entropy coding the syntax elements related to the transform.

FIG. 8 is a diagram specifically illustrating a method for acquiring a residual signal by inverse transforming a transform coefficient by an encoder and a decoder. Hereinafter, for convenience of description, it will be described that an inverse transform operation is performed through the inverse transform unit of each of the encoder and the decoder. The inverse transform unit may obtain the residual signal by inverse transforming an inverse quantized transform coefficient. First, the inverse transform unit may detect whether or not an inverse transform of a specific region is performed from the transform-related syntax element of the specific region. According to an embodiment, when a transform-related syntax element on a specific transform block indicates a transform skip, the transform on the transform block may be omitted. In this case, both the inverse primary transform and the inverse secondary transform may be omitted for the transform block. In addition, the inverse quantized transform coefficient may be used as the residual signal. For example, the decoder may reconstruct the current block by using the inverse quantized transform coefficient as the residual signal. The above-described inverse primary transform represents an inverse transform for the primary transform, and may be referred to as a primary inverse transform. The inverse secondary transform represents an inverse transform for the secondary transform, and may be referred to as a secondary inverse transform or inverse LFNST.

According to another embodiment, the transform-related syntax element for the specific transform block may not indicate a transform skip. Here, the inverse transform unit may determine whether to perform inverse secondary transform for secondary transform. For example, if the transform block is a transform block of an intra-predicted block, inverse secondary transform may be performed on the transform block. In addition, a secondary transform kernel used for the corresponding transform block may be determined based on an intra prediction mode corresponding to the transform block. As another example, whether to perform inverse secondary transform may be determined based on the size of the transform block. As still another example, if a flag indicating whether a low frequency non-separable transform is applied indicates an application of the low frequency non-separable transform to a current block, an operation of obtaining one or more secondary inverse-transformed coefficient by performing inverse secondary transform of a scaled transform coefficient may be performed. The inverse secondary transform may be performed after dequantization and before an inverse primary transform.

The inverse transform unit may perform inverse primary transform of the dequantized transform coefficient or the inverse secondary transformed transform coefficient. Here, the dequantized transform coefficient may denote a scaled transform coefficient. Like the primary transform, the inverse primary transform may be separable into a vertical transform and a horizontal transform. For example, the inverse transform unit may perform a vertical inverse transform and a horizontal inverse transform on the transform block to obtain a residual block. The inverse transform unit may inverse transform the transform block based on the transform kernel used for transforming the transform block. For example, the encoder may explicitly or implicitly signal information indicating a transform kernel applied to the current transform block among a plurality of available transform kernels. The decoder may select a transform kernel to be used for an inverse transform of the transform block among a plurality of available transform kernels by using information indicating the signaled transform kernel. The inverse transform unit may reconstruct the current block by using the residual signal obtained through inverse transform on the transform coefficient.

On the other hand, the distribution of the residual signal of a picture may be different for each region. For example, a distribution of values for the residual signal in a specific region may vary according to the prediction method. When transforming a plurality of different transform regions using the same transform kernel, coding efficiency may vary for each transform region depending on distributions and characteristics of values in the transform region. Accordingly, when a transform kernel used for transforming a specific transform block is adaptively selected from among a plurality of available transform kernels, coding efficiency may be further improved. That is, the encoder and the decoder may be configured to additionally use a transform kernel other than the basic transform kernel in transforming a video signal. A method for adaptively selecting a transform kernel may be referred to as an adaptive multiple core transform (AMT) or multiple transform selection (MTS). A method of adaptively selecting a transform kernel will be described later with reference to related drawings. In the present disclosure, for convenience of explanation, transform and inverse transform may be collectively referred to as transform. Transform performed by an inverse transform unit of an encoder and a decoder during a decoding process may be understood as inverse transform, and transform performed by a transform unit of an encoder during an encoding process may be understood as transform. Further, the transform kernel and the inverse transform kernel are collectively referred to as a transform kernel.

Hereinafter, multiple transform kernels that can be used for the transform of a video signal will be described with reference to FIG. 9. According to an embodiment of the present disclosure, a transform kernel may be a kernel derived based on a specific basis function. Each of the multiple different transform kernels may be obtained based on a different basis function. Multiple transform kernels may be obtained based on a basis function corresponding to each of different transform types.

FIG. 9 illustrates a basis function corresponding to each transform type. According to an embodiment, a transform kernel usable for transform of a video residual signal may include at least one of a transform kernel based on discrete cosine transform type 2 (DCT-II), a transform kernel based on discrete cosine transform type 5 (DCT-V), a transform kernel based on discrete cosine transform type 8 (DCT-VIII), a transform kernel based on discrete sine transform type 1 (DST-I), and a transform kernel based on discrete sine transform type 7 (DST-VII).

Referring to FIG. 9, basis functions corresponding to the above-described respective transform types of DCT-II, DCT-V, DCT-VIII, DST-I, and DST-VII may be expressed as cosine or sine functions. For example, the basis functions corresponding to respective DCT-II, DCT-V, and DCT-VIII may be a cosine-type function, and the basis functions corresponding to respective DST-I and DST-VII may be a sine type function. Further, the basis function corresponding to a specific transform type may be expressed in the form of a basis function for each frequency bin. For example, a basis function of Ti(j) may be a basis function corresponding to the i-th frequency bin. That is, as a value indicated by i is smaller, a basis function corresponding to a lower frequency is indicated. Further, as a value indicated by i is greater, a basis function corresponding to a higher frequency is indicated. In FIG. 9, j may indicate an integer from 0 to N−1.

The basis function of Ti(j) may be expressed as a two-dimensional matrix representing an element in the i-th row and the j-th column. Here, a transform using transform kernels based on the transform type of FIG. 9 has a separable characteristic in performing transform. That is, transform on the residual signal may be separately transformed in each of a horizontal direction and a vertical direction. For example, a transform using transform matrix T regarding residual block X may be expressed as matrix operation TXT'. Here, T' refers to a transpose matrix of transform matrix T. In addition, inverse transform using transform matrix T regarding transform block Y may be expressed as T'YT.

Values of the transform matrix defined by the basis functions illustrated in FIG. 9 may be in a decimal form rather than an integer form. It may be difficult to implement decimal values in hardware in a video encoding apparatus and a decoding apparatus. Therefore, a transform kernel integer-approximated from an original transform kernel including values in the form of decimals may be used for encoding and decoding of a video signal. The approximated transform kernel including integer values may be generated via scaling and rounding of the original transform kernel. The integer value included in the approximated transform kernel may be a value within a range that is expressible by a preconfigured number of bits. The preconfigured number of bits may be 8 or 10. According to the approximation, orthonormal properties of DCT and DST may not be maintained. However, a coding efficiency loss resulting therefrom is not large, and therefore it may be advantageous, in terms of hardware implementation, to approximate the transform kernel in an integer form.

Figure 10:
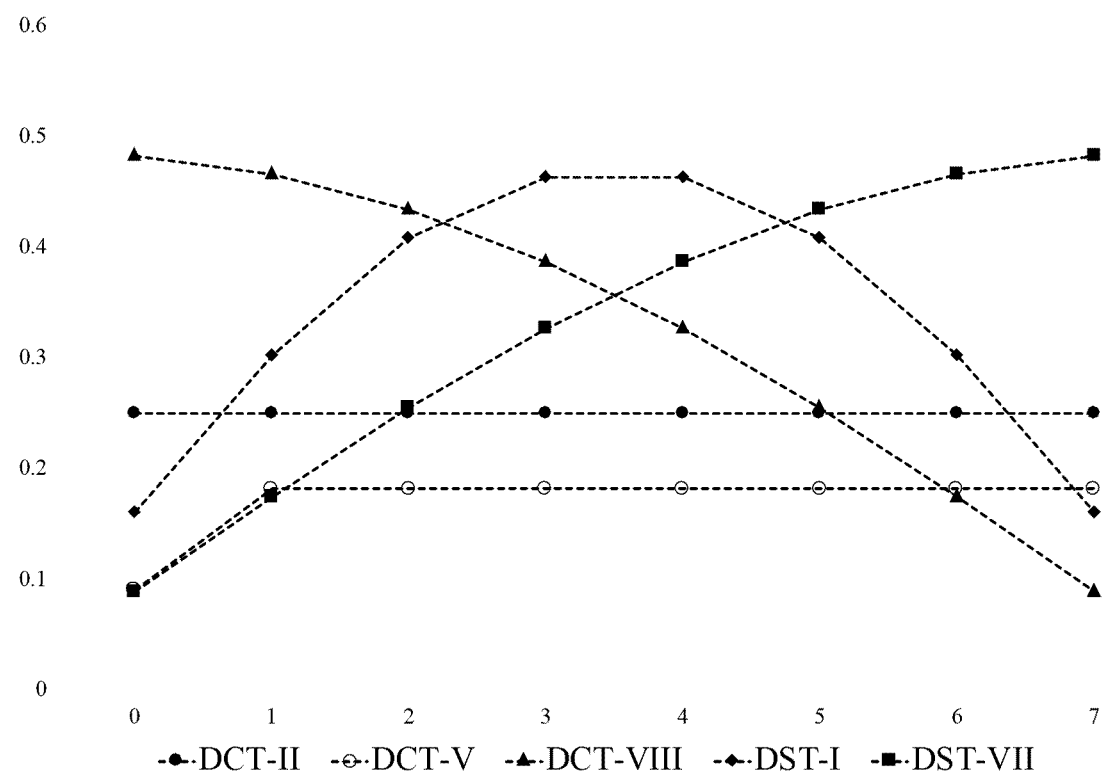
FIG. 10 illustrates a signal magnitude for each index of transform types of DCT-II, DCT-V, DCT-VIII, DST-I, and DST-VII.

FIG. 10 illustrates a signal magnitude for each index of transform types of DCT-II, DCT-V, DCT-VIII, DST-I, and DST-VII. FIG. 10 illustrates a form of a basis function corresponding to a lowest frequency bin from among basis functions for each frequency bin. FIG. 10 illustrates a basis function corresponding to a 0-th frequency bin from among basis functions for each frequency bin. In FIG. 10, a horizontal axis represents index j (j=0, 1, . . . , N−1) in the basis function, and a vertical axis represents a magnitude value of a signal. N represents the number of samples in a specific area to be subjected to transform.

As illustrated in FIG. 10, in DST-VII, as index j increases, a signal magnitude tends to increase. Therefore, like a residual block of an intra-predicted block, DST-VII may be efficient for transform of a residual block in which a magnitude of a residual signal increases as the distance in the horizontal and vertical directions increases with reference to the upper left of the residual block.

On the other hand, in DCT-VIII, as index j increases, a signal magnitude tends to decrease. That is, DCT-VIII satisfies duality characteristics with DST-VII. Therefore, DCT-VIII may be effective for transform of a residual block in which a magnitude of a residual signal decreases as the distance in the horizontal and vertical directions increases with reference to the upper left of the residual block.

In DST-I, as index j in the basis function increases, a signal magnitude increases, and then the signal magnitude decreases starting from a specific index. Therefore, DST-I may be efficient for transform of a residual block having a large residual signal magnitude at the center thereof.

A 0-th basis function of DCT-II represents DC. Therefore, it may be efficient for transform of a residual block having a uniform signal magnitude distribution inside thereof.

DCT-V is similar to DCT-II. However, in DCT-V, a signal magnitude when index j is 0 has a value smaller than that of a signal magnitude when index j is not 0. That is, when index j is 1, DCT-V has a signal model in which a straight line is bent.

As described above, if a transform kernel having a separable characteristic is used, transform may be performed in each of the horizontal and vertical directions of the residual block. Specifically, transform of the residual block may be performed conducting a 2D matrix multiplication operation twice. The matrix multiplication operation may involve the computation amount, which corresponds to a level equal to or higher than a preconfigured level. Accordingly, when the residual block is transformed using a DCT-II-based transform kernel, the computation amount may be reduced by using a butterfly structure. However, implementation of DST-VII and DCT-VIII may be difficult in terms of the computation amount, due to relatively high implementation complexity. Accordingly, transform types, which have similar characteristics to those of DST-VII and DCT-VIII, respectively, and have relatively low implementation complexity, may be used.

Figure 11:
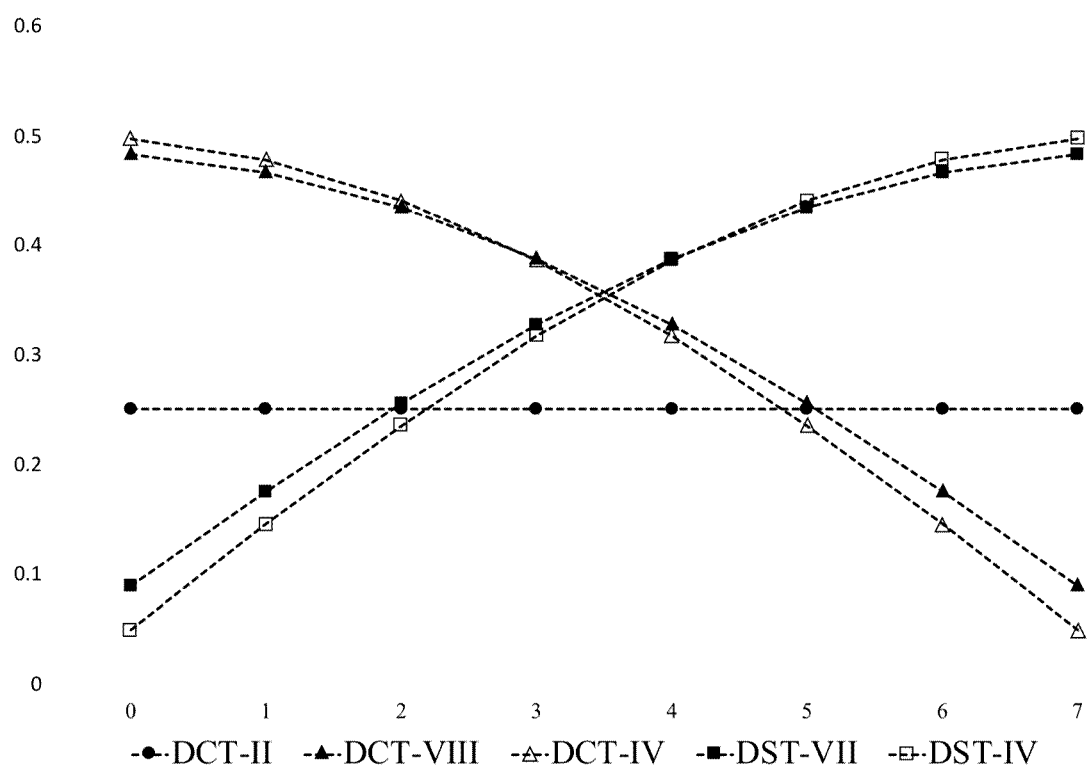
FIG. 11 illustrates a signal magnitude for each index of transform types of DST-IV, DCT-IV, DST-VII, and DCT-VIII.

According to an embodiment, discrete sine transform type-IV (DST-IV) and discrete cosine transform type-IV (DCT-IV) may replace DST-VII and DCT-VIII, respectively. FIG. 11 illustrates a signal magnitude for each index of a transform type, such as DST-IV, DCT-IV, DST-VII, and DCT-VIII. FIG. 11(a) illustrates a basis function corresponding to DST-IV and a basis function corresponding to DCT-IV. DST-IV and DCT-IV for the number of samples, N, may be derived from DCT-II for the number of samples, 2N. That is, a DCT-II partial butterfly structure for the number of samples, 2N, includes DCT-IV for the number of samples, N. DST-IV for the number of samples, N, may be implemented by arranging a sign inversion operation and a corresponding basis function in reverse order from DCT-IV for the number of samples, N.

As illustrated in FIG. 11(b), DST-IV indicates a signal model similar to that of DST-VII. Accordingly, like a residual block of an intra-predicted block, DST-IV may be efficient for transform of a residual block in which a residual signal magnitude increases as the distance in the horizontal and vertical directions increases with reference to the upper left of the residual block. DCT-IV shows a signaling model similar to that of DCT-VIII. Accordingly, DCT-IV may be effective for transform of a residual block having a residual signal magnitude, which is largest at a specific boundary and decreases in the direction to another boundary further from the specific boundary.

If only a transform kernel based on one of the above-described transform types is used for transforming of a video signal, it is difficult to perform adaptive transform according to a characteristic of an original signal and a pattern of a residual signal, which varies according to a prediction mode. Therefore, in transform of a residual signal, an encoder and a decoder according to an embodiment of the present disclosure may improve coding efficiency by using a transform kernel selected for each area from among multiple available transform kernels.

In the existing high efficiency video coding (HEVC) standard, a residual signal is transformed using a DCT-II-based transform kernel from among the multiple transform types described above, and residual signal transform is performed by limitedly using a DST-VII-based transform kernel for only an intra-predicted block having the size of 4×4. As described above, DCT-II may be suitable for transform of a residual signal of an inter-predicted block, but may not be suitable for transform of a residual signal of an intra-predicted block. That is, according to a method of predicting a current block, a pattern of a residual signal within the residual block may differ.

Accordingly, at least one transform kernel selected from among multiple available transform kernels may be used for transforming of a specific transform block. According to an embodiment, the encoder and the decoder may select a transform kernel for at least one transform area of the current block, based on the method of predicting the current block. This method may be referred to as adaptive multiple core transform (AMT) described above. If a transform kernel determined according to a prediction method for a specific area is used for transforming of the corresponding area, coding efficiency may be improved compared to a case where transform is performed for all areas by using a DCT-II-based transform kernel.

FIG. 12 illustrates a method of configuring a transform candidate set according to a prediction mode of a current block. According to an embodiment of the present disclosure, an encoder and a decoder may select a transform kernel used for at least one transform area of a current block, based on a transform candidate set corresponding to the current block. The transform candidate set may include multiple candidate transform kernels. The transform candidate set may include different candidate transform kernels according to a prediction mode of the current block.

According to an embodiment, the current block may be a block predicted based on one of multiple intra prediction modes. Here, a pattern of a residual signal of the current block may differ according to the intra prediction mode used for prediction of the current block. As described above, intra prediction mode information may indicate an intra prediction direction. Accordingly, the pattern of the residual signal of the current block may differ according to a prediction direction indicated by intra prediction mode information of the current block. The encoder and the decoder may improve coding efficiency by using multiple different transform candidate sets according to the prediction direction.

Accordingly, the encoder and the decoder may determine a transform kernel to be used in a transform area of the current block from a transform candidate set corresponding to the intra prediction mode of the current block. For example, the transform kernel to be used in the transform area may be signaled via a candidate index indicating one of multiple candidate transform kernels included in the transform candidate set. If the transform candidate set corresponding to the intra prediction mode of the current block includes two candidate transform kernels, a candidate index indicating the transform kernel used in the transform area may be expressed as 1-bit.

Further, different transform candidate sets may be used for each of the vertical and horizontal directions of the transform area. Due to characteristics of the intra prediction method preformed based on directionality, a vertical direction pattern and a horizontal direction pattern of a residual signal of a predicted area may be different from each other. Therefore, a vertical transform kernel and a horizontal transform kernel for a block predicted using a specific intra prediction mode may be obtained from an individual transform candidate set. In the present disclosure, a transform kernel used for vertical transform of a specific transform area may be referred to as a vertical transform kernel. A transform kernel used for horizontal transform of a specific transform area may be referred to as a horizontal transform kernel. FIG. 12(a) illustrates transform candidate sets corresponding to 67 intra prediction mode indices, respectively. In FIG. 12(a), vertical (V) denotes a transform candidate set for a vertical transform kernel. Horizontal (H) denotes a transform candidate set for a horizontal transform kernel.

FIG. 12(b) illustrates a candidate transform kernel defined according to a transform candidate set. According to an embodiment, a first transform candidate set (e.g., transform set 0 in FIG. 12B) may include a candidate transform kernel based on DST-VII and a candidate transform kernel based on DCT-VIII. A second transform candidate set (e.g., transform set 1 in FIG. 12(b)) may include a candidate transform kernel based on DST-VII and a candidate transform kernel based on DST-I. A third transform candidate set (e.g., transform set 2 in FIG. 12(b)) may include a candidate transform kernel based on DST-VII and a candidate transform kernel based on DCT-V. FIG. 12 illustrates that a transform candidate set includes two candidate transform kernels, but the present disclosure is not limited thereto.

According to another embodiment, the current block may be an inter-predicted block. Here, a transform kernel used in a transform area of the current block may be obtained from a preconfigured transform candidate set. For example, the preconfigured transform candidate set may be one of the above-described multiple transform candidate sets. FIG. 12(c) illustrates a transform candidate set corresponding to a current block if the current block is an inter prediction block. For example, the preconfigured transform candidate set corresponding to the inter prediction block may include a candidate transform kernel based on DCT-VIII and a candidate transform kernel based on DST-VII. That is, a transform kernel used for the transform area of the inter prediction block may be one of a candidate transform kernel based on DCT-VIII and a candidate transform kernel based on DST-VII.

According to an additional embodiment, the above-described embodiments may be limitedly applied only to a transform block of a luma component. Here, a preconfigured default transform kernel may be used for a transform block of a chroma component. For example, the default transform kernel may be a DCT-II-based transform kernel.

According to an additional embodiment, the encoder may not signal a candidate index according to the number of non-zero transform coefficients in the transform area. Here, the decoder may determine a transform kernel by comparing the number of non-zero transform coefficients in the transform area with a preconfigured number. For example, if the number of non-zero transform coefficients is one or two, the candidate index may not be signaled. Here, an inverse transform unit may perform transform of the corresponding area by using a preconfigured transform kernel. The preconfigured transform kernel may be a DST-VII-based transform kernel.

FIG. 13 illustrates a horizontal transform kernel and a vertical transform kernel determined according to a set index. According to an embodiment of the present disclosure, information indicating a transform kernel for a residual signal of a specific area from among multiple available transform kernels may be signaled. Here, information indicating one of the multiple available transform kernels may be signaled regardless of a prediction mode corresponding to the corresponding area. For example, an encoder may signal transform kernel information indicating the transform kernel for the residual signal of the specific area. A decoder may obtain the transform kernel for the corresponding area by using the signaled transform kernel information. The transform kernel information may include at least one of information indicating a horizontal transform kernel of the corresponding area and information indicating a vertical transform kernel of the corresponding area. This method may be referred to as multiple transform selection (MTS) described above.

The transform kernel may be indicated by one of kernel indices indicating the multiple available transform kernels, respectively. According to an embodiment, a transform kernel corresponding to kernel index '0' may be a DCT-II-based transform kernel, a transform kernel corresponding to kernel index '1' may be a DST-VII-based transform kernel, and a transform kernel corresponding to kernel index '2' may be a DCT-VIII-based transform kernel.

According to an embodiment, transform kernel information may be a set index indicating a transform kernel set. The transform kernel set may represent a combination of a transform kernel to be used as a vertical transform kernel and a transform kernel to be used as a horizontal transform kernel. The set index may indicate a combination of a kernel index indicating a horizontal transform kernel and a kernel index indicating a vertical transform kernel. Referring to FIG. 13(a), when transform kernel information of a specific area indicates a set index indicating a first transform kernel set (for example, in a case of FIG. 13(a) where tu_mts_idx [x0][y0] is 0), a vertical transform kernel of the corresponding area may be a transform kernel corresponding to kernel index '0'. A horizontal transform kernel of the area may be a transform kernel corresponding to kernel index '0'.

Further, FIG. 13(b) illustrates a transform kernel corresponding to a kernel index. Referring to FIG. 13(b), a transform kernel corresponding to first kernel index "0" may indicate a DCT-II-based transform kernel. Referring to FIG. 13(b), a transform kernel corresponding to second kernel index "1" may indicate a DST-VII-based transform kernel. Referring to FIG. 13(b), a transform kernel corresponding to third kernel index "2" may indicate a DCT-VIII-based transform kernel.

According to an additional embodiment, the above-described embodiments may be limitedly applied only to a luma block. Here, a preconfigured default transform kernel may be used for a chroma component. For example, the default transform kernel may be a transform kernel based on DCT-II. The above-described set index may be signaled in units of transform blocks.

Further, information indicating whether a set index is signaled may be signaled via a header of a high level including a current block. Here, the high level may indicate a slice/tile, a picture, or a sequence, which includes the current block. Information indicating whether the set index is signaled may be signaled via an individual flag for each prediction method. For example, in determination of a transform kernel of a block, a flag indicating whether a set index is used may be independently configured for each of an intra-predicted block and an inter-predicted block.

According to an embodiment, if information, which indicates whether a set index of a high level including a transform block is signaled, indicates that the set index is not explicitly signaled, a transform kernel regarding the corresponding transform block may be determined using a different method. For example, a transform kernel to be applied to inverse transform of the current transform block may be determined based on information derived from information other than the set index. Specifically, the decoder may derive information indicating the transform kernel for the current transform block, from information signaled in relation to the current transform block. That is, information indicating a vertical transform kernel and information indicating a horizontal transform kernel, which are to be used in the transform block may be implicitly signaled. According to another embodiment, if information, which indicates whether a set index of a high level including a transform block is signaled, indicates that the set index is explicitly signaled, the decoder may obtain a transform kernel for the transform block based on the signaled set index.

According to an additional embodiment, whether the encoder signals a set index may be determined according to the number of non-zero transform coefficients in a transform area. Here, the decoder may determine the transform kernel by comparing the number of non-zero transform coefficients in the transform area with a preconfigured number. For example, if the number of non-zero transform coefficients is two or less, the set index may not be signaled. Here, an inverse transform unit may perform transform of the corresponding area by using a preconfigured transform kernel. The preconfigured transform kernel may be a DST-VII-based transform kernel.

Since a residual signal, which is the difference between an original signal and a predicted signal (predictor), shows a characteristic that the energy distribution of the signal varies according to a prediction method, if the transform kernel is adaptively selected according to the prediction method such as MTS, the coding efficiency can be improved. In addition, when transform using only the MTS or DCT-II kernel is referred to as a primary transform, secondary transform may be additionally performed on the primary transformed coefficient block to thereby improve encoding efficiency. This secondary transform can improve energy compaction, especially for the intra-picture predicted residual signal block where strong energy is highly likely to exist in a direction other than the horizontal or vertical direction of the residual signal block.

Figure 14:
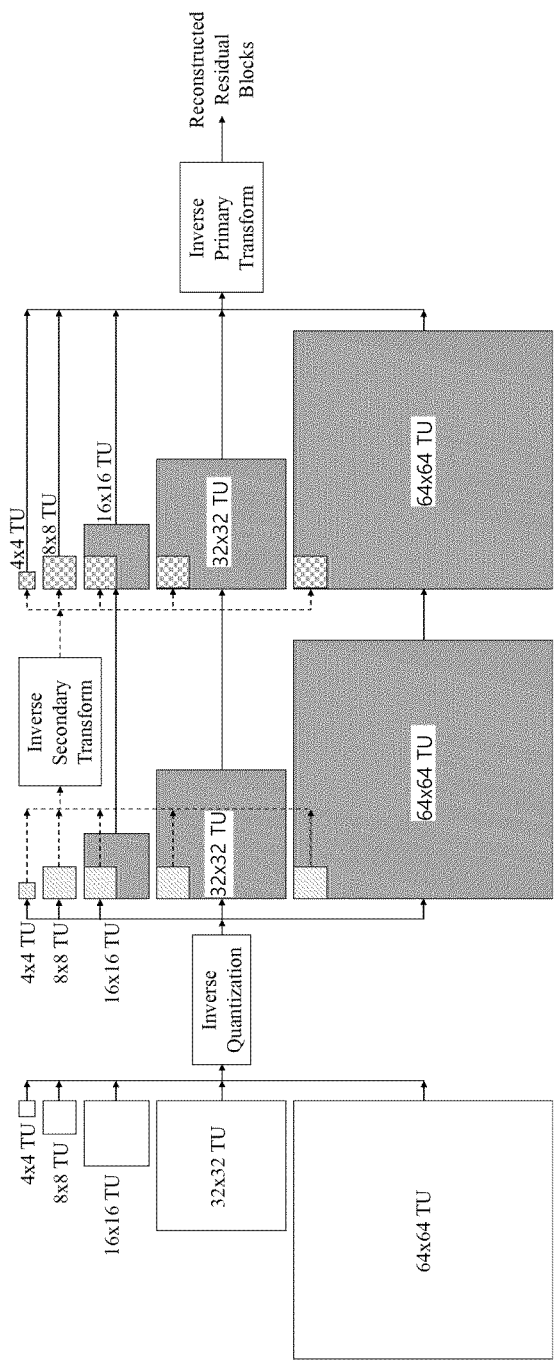
FIG. 14 illustrates a process of reconstructing a residual signal at a block level in a decoder configured to perform a secondary transform.

FIG. 14 illustrates a process of reconstructing a residual signal in a decoder configured to perform a secondary transform at a block level. Reconstruction of the residual signal may be performed in units of a transform unit (TU) or the sub-block within the TU. FIG. 14 illustrates a process of reconstructing a residual signal block to which secondary transform is applied, and the inverse secondary transform may be first performed on a dequantized transform coefficient block. Although the decoder may perform the inverse secondary transform on all samples of W×H (W: the number of horizontal samples, H: the number of vertical samples) in the TU, the inverse secondary transform may be performed only on a sub-block having a size of W'×H' on the upper left, which is a low-frequency region, by considering the complexity. Here, W' is less than or equal to W, and H' is less than or equal to H. The size of the sub-block, W'×H', on the upper left may be configured differently according to the TU size. For example, if min(W, H)=4, both W' and H' may be configured to be 4, and if min(W, H)=8, both W' and H' may be configured to be 8. After performing the inverse secondary transform, the decoder may acquire a sub-block transform coefficient having the size, W'×H', on the upper left in the TU may be obtained, and may perform primary inverse transform on the transform coefficient block having the entire size of W×H to thereby reconstruct the residual signal block.

Whether or not the secondary transform is performed may be indicated in the form of a 1-bit flag by being included in at least one of high level syntax (HLS) such as an SPS, a PPS, slice header, or tile group header.

If performing of secondary transform is indicated by HLS, whether to apply secondary transform at a coding unit (CU) level may be indicated by a 1-bit flag. In addition, when secondary transform is applied to the current block, an index indicating a transform kernel used for secondary transform may be indicated, and the secondary transform may be performed using a transform kernel indicated by the index within a preconfigured transform kernel set according to the prediction mode. The index representing the transform kernel may be binarized using either a truncated unary or a fixed length binarization method. The 1-bit flag indicating whether the secondary transform is applied at the CU level or the index indicating the transform kernel may be indicated using one syntax element, and in the present disclosure, this is referred to as a secondary transform index (lfnst_idx) or a low frequency non-separable transform index (lfnst_idx). That is, lfnst_idx may indicate whether secondary transform is applied and a transform kernel used when the secondary transform is applied. For example, if lfnst_idx is 0, it may indicate that secondary transform is not used. On the other hand, if lfnst_idx is greater than 0, it may indicate that the secondary transform is applied, and a transform kernel used for the secondary transform may be selected based on lfnst_idx. Such lfnst_idx may be encoded through the entropy coder such as context adaptive binary arithmetic coding (CABAC) and context adaptive variable length coding (CAVLC) that perform adaptive coding based on the context. If the current CU is partitioned into multiple TUs smaller than the CU size, the secondary transform may not be applied, and lfnst_idx, which is a syntax element related to the secondary transform, may be configured to be 0 in the decoder without explicit signaling.

Meanwhile, since the DCT-II, DST-VII, and DCT-VIII kernels used in the primary transform have a separable characteristic, two transforms in the horizontal/vertical direction may be performed on samples in the residual block of size N×N, and the size of the transform kernel may be N×N. On the other hand, in a case of secondary transform, since the transform kernel has a non-separable characteristic, if the number of samples to be considered in the secondary transform is N×N, one transform may be performed, and the size of the transform kernel may be $(n^2) \times (n^2)$. For example, when the secondary transform is performed on the 4×4 coefficient block on the upper-left, a 16×16 sized transform kernel may be applied, and when the secondary transform is performed on the 8×8 coefficient block on the upper-left, a 64×64 sized transform kernel may be applied. Since the 64×64 sized transform kernel involves a large amount of multiplication operations, it can be a heavy burden on the encoder and decoder. Therefore, when the number of samples considered in the secondary transform decreases, the computation amount and the memory required for storing the transform kernel may be reduced.

Figure 15:
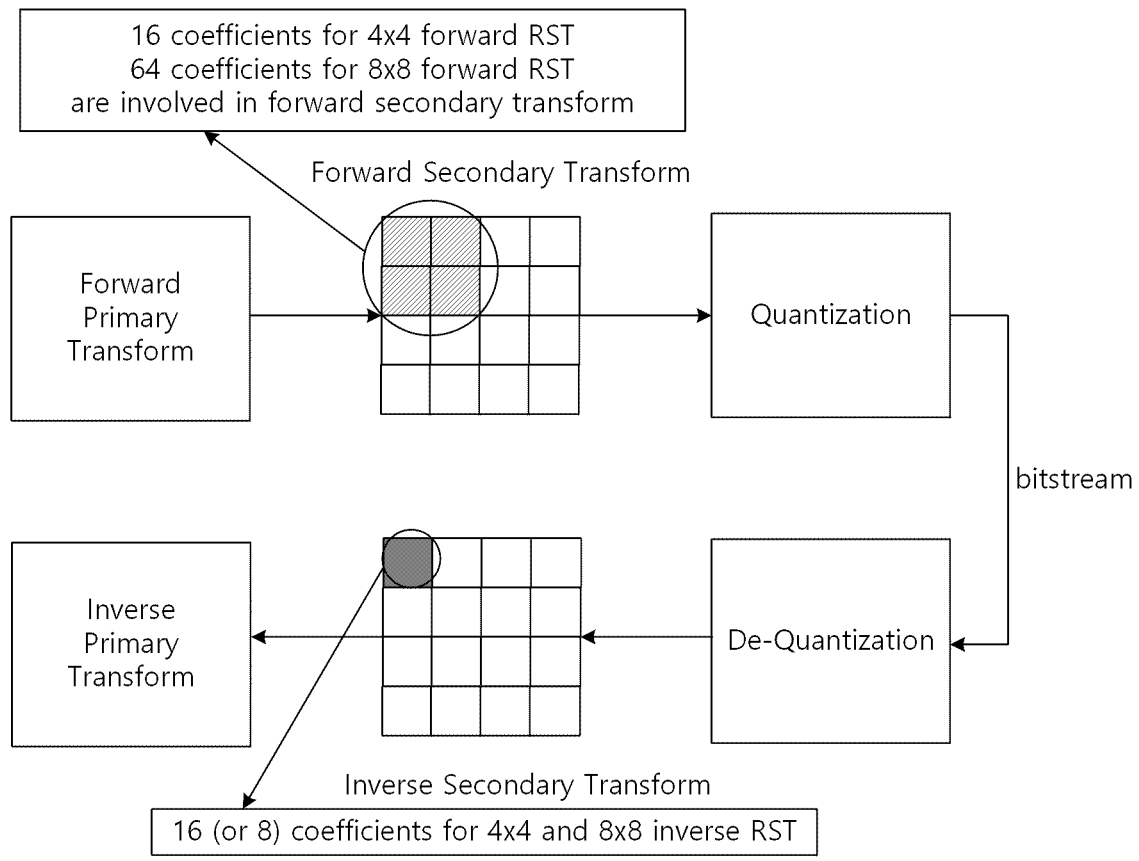
FIG. 15 illustrates a method of applying a secondary transform using a reduced number of samples.

FIG. 15 illustrates a method for applying a secondary transform using a decreased number of samples. The secondary transform may be expressed by multiplication of a secondary transform kernel matrix and a primary-transformed coefficient vector, and may be interpreted as mapping the primary-transformed coefficient to another space. Here, when the number of coefficients to be secondary-transformed decreases, that is, when the number of basis vectors configuring the secondary transform kernel decreases, the computation amount required for the secondary transform and a memory capacity required for storing the transform kernel may be reduced. For example, when performing the secondary transform on the 8×8 coefficient block on the upper left, the secondary transform kernel of the size of 16×64 may be applied when the number of coefficients to be secondary-transformed is reduced to 16 and the inverse secondary transform of the size of 64×16 may be applied.

Referring to FIG. 15, the encoder may first perform a primary transform (forward primary transform) on a residual signal block to obtain a primary-transformed coefficient block. When the size of the primary-transformed coefficient block is M×N, with regard to an intra predicted block having a value of min(M, N) of 4, a 4×4 secondary transform (forward secondary transform), may be performed on the 4×4 samples on the upper left in the primary-transformed coefficient block. The kernel size of the 4×4 secondary transform may be 16×16. With regard to an intra predicted block having a value of min(M, N) equal to or greater than 8, an 8×8 secondary transform may be performed on 8×8 samples of the primary-transformed coefficient block on the upper left. Since the 8×8 secondary transform involves a large computation amount and memory, only some of the 8×8 samples may be utilized. Specifically, when the element of the i-th row and j-th column of the 8×8 block on the upper left in the primary-transformed coefficient block is expressed as x(i, j), 48 primary transformed coefficients existing in both regions {0<=i<=3, 0<=j<=7} and {4<=i<=7, 0<=i<=3} may be inputs of the secondary transform. Here, the transform kernel size of the 8×8 secondary transform may be 16×48. As another embodiment for reducing the computation amount required for the secondary transform, only the primary transform coefficients included in the left-upper sub-block region considered in the secondary transform may be calculated, and the remaining regions may be configured to be 0 without operation. Accordingly, it is possible to reduce the computation amount required for quantization, and the number of non-zero transform coefficients included in a bitstream may be a preconfigured value or less. With regard to the preconfigured value, both the encoder and the decoder may use the same value, and this value may be different depending on the size of the transform block. For example, if the size of the transform block is 4×4 or 8×8, the preconfigured value may be 8, and otherwise (when the size of the transform block is neither 4×4 nor 8×8), the preconfigured value may be 16.

Since the secondary transform can be calculated by multiplication of the secondary transform kernel matrix and the input vector, the encoder may first configure coefficients (a two-dimensional array form) in the sub-block on the upper left in the primary-transformed coefficient block in a first dimensional vector form. A method for configuring the coefficients in vectors may depend on the intra prediction mode. When the predictor of the current block is obtained by inter prediction, the secondary transform index (lfnst_idx[xTbY][yTbY]) may be 0. That is, when the secondary transform index (lfnst_idx[xTbY][yTbY]) is not 0, the predictor of the current block may be obtained through intra prediction. In addition, when the secondary transform index (lfnst_idx[xTbY][yTbY]) is 0, the flag (lfnstEnabledFlag) indicating whether the low frequency non-separable transform is applied may indicate that the low frequency non-separable transform is not applied. That is, when the flag (lfnstEnabledFlag), indicating whether the low frequency non-separable transform is applied, indicates application of the low frequency non-separable transform, the secondary transform index (lfnst_idx[xTbY][yTbY]) may not be 0. In addition, when the flag (lfnstEnabledFlag), indicating whether the low frequency non-separable transform is applied, indicates application of the low frequency non-separable transform, the predictor of the current block may be obtained by intra prediction. The flag (lfnstEnabledFlag) indicating whether the low frequency non-separation transform is applied may be obtained based on the secondary transform index. A process in which the flag (lfnstEnabledFlag) indicating whether the low frequency non-separation transform is applied is obtained based on the secondary transform index will be described with reference to FIG. 25.

For example, when the intra prediction mode is less than or equal to the 34-th angular mode among the intra prediction modes illustrated in FIG. 6, or INTRA_LT_CCLM, INTRA_T_CCLM, and INTRA_L_CCLM modes for predicting chroma samples using the linear relationship between luma and chroma, coefficients may be configured in vectors by scanning the sub-block on the upper left in the primary-transformed coefficient block in the horizontal direction. When the element of the i-th row and j-th column of the n×n block on the upper left in the primary-transformed coefficient block is expressed as x(i, j), the vectorized coefficients may be expressed as [x(0, 0), x(0, 1), . . . , x(0, n−1), x(1, 0), x(1, 1), . . . , x(1, n−1), . . . , x(n−1, 0), x(n−1, 1), . . . , x(n−1, n−1)]. On the other hand, if the intra prediction mode is greater than the 34-th angular mode, coefficients may be configured in vectors by scanning the sub-block on the upper left in the primary-transformed coefficient block in the vertical direction. The vectorized coefficients may be expressed as [x(0, 0), x(1, 0), . . . , x(n−1, 0), x(0, 1), x(1, 1), . . . , x(n−1, 1), . . . , x(0, n−1), x(1, n−1), . . . , x(n−1, n−1)]. When only some of the 8×8 samples are utilized in the 8×8 secondary transform, the coefficient x(i, j) where i>3 and j>3 may not be included in the above-described vector configuration method, and the size of transform kernel may be 16×48.

The encoder may acquire secondary-transformed coefficients by multiplication of sub-block samples on the upper left in the vectorized primary transform coefficient block and the secondary transform kernel matrix. The secondary transform kernel may be determined according to the size of the transform unit, the intra mode, and the syntax element indicating the transform kernel.

The secondary-transformed coefficients are in the form of a vector, and thus the coefficients may be expressed as data in a two-dimensional form. The coefficients that have been secondary-transformed according to a preconfigured scan order may be configured by a coefficient sub-block on the upper left. The preconfigured scan order may be an up-right diagonal scan order and the present disclosure is not limited thereto, and the up-right diagonal scan order may be determined based on a method described in FIGS. 16 and 17 to be described later.

Transform coefficients of a total transform unit size including secondary-transformed coefficients may be included in a bitstream and transmitted after quantization. The bitstream may include a syntax element related to the secondary transform. Specifically, the bitstream may include information on whether the secondary transform is applied to the current block and information indicating a transform kernel. The bitstream may include quantized transform coefficients, and the number of non-zero transform coefficients may be less than or equal to a preconfigured value. With regard to the preconfigured value, both the encoder and the decoder may use the same value, and this value may be different depending on the size of the transform block. For example, if the size of the transform block is 4×4 or 8×8, the preconfigured value may be 8, otherwise (when the size of the transform block is neither 4×4 nor 8×8), the preconfigured value may be 16.

The decoder may first parse the quantized transform coefficients from the bitstream, and non-zero transform coefficients included in a bitstream may differ according to the transform block size. The decoder may obtain the transform coefficients through de-quantization. The decoder may determine whether the inverse secondary transform is performed on the current block based on the syntax element related to the secondary transform. When the inverse secondary transform is applied to the current transform unit, 8 or 16 transform coefficients may be inputs of the inverse secondary transform, depending on the size of the transform unit. The number of coefficients to be inputs of the inverse secondary transform may match the number of coefficients output from the secondary transform of the encoder. For example, when the size of the transform unit is 4×4 or 8×8, 8 transform coefficients may be inputs of the inverse secondary transform, and otherwise, 16 transform coefficients may be inputs of the inverse secondary transform. When the size of the transform unit is M×N, with regard to the intra-predicted block having a value of min(M, N) of 4, the 4×4 inverse secondary transform may be performed on 16 or 8 coefficients of the 4×4 sub-block on the upper left in the transform coefficient block. The transform kernel size of the 4×4 inverse secondary transform may be 16×16, and the inverse secondary transform kernel matrix may be a transpose matrix of the secondary transform kernel matrix. With regard to the intra predicted block having min(M, N) of 8 or more, the 8×8 inverse secondary transform may be performed on 16 or 8 coefficients of the 4×4 sub-block on the upper left in the transform coefficient block. The transform kernel size of the 8×8 inverse secondary transform may be 48×16, and the inverse secondary transform kernel matrix may be a transpose matrix of the secondary transform kernel matrix.

Since the inverse secondary transform may be calculated by multiplication of the inverse secondary transform kernel matrix and the input vector, the decoder may configure, in a vector form, a de-quantized transform coefficient block that has been input first according to the preconfigured scan order. The preconfigured scan order may be an up-right diagonal scan order, but the present disclosure is not limited thereto, and the upper-right diagonal scan order may be determined based on a method described in FIGS. 16 and 17 to be described later.

The decoder may obtain a primary-transformed coefficient by multiplication of a vectorized transform coefficient and the inverse secondary transform kernel matrix, and the inverse secondary transform kernel may be determined according to the size of the transform unit, the intra mode, and the syntax element indicating the transform kernel. The inverse secondary transform kernel matrix may be a transpose matrix of the secondary transform kernel matrix. Taking implementation complexity into account, elements of the kernel matrix may be integers expressed by 10-bit or 8-bit accuracy.

Since the primary transform coefficient obtained through the inverse secondary transform is in the vector form, the decoder may again express the coefficient as data in the two-dimensional form, which may depend on the intra mode. Here, the mapping relationship based on the intra mode applied by the encoder may be equally applied thereto.

The decoder may obtain the residual signal by performing the inverse primary transform on the transform coefficient block of the entire transform unit size including transform coefficients obtained by performing the inverse secondary transform.

Although not shown in FIG. 15, a bit shift operation and a clipping operation may be performed between each process in order to express a result of the operation as a preconfigured number of bits. The preconfigured number of bits may be 16.

FIG. 16 illustrates a method for determining an up-right diagonal scan order used in an encoder and a decoder. A process of initializing a scan order during encoding or decoding may be performed, and an array including scan order information may be initialized according to the block size. Specifically, the variables log 2BlockWidth and log 2BlockHeight may be values in the range of [0, 4], and 6.5.2 up-right diagonal scan order array initialization process illustrated in FIG. 16 in which 1<<log 2BlockWidth and 1<<log 2BlockHeight are inputted for all the available combinations of log 2BlockWidth and log 2BlockHeight may be performed. The output of the up-right diagonal scan order array initialization process may be assigned to DiagScanOrder[log 2BlockWidth][log 2BlockHeight]. Through the 6.5.2 up-right diagonal scan order array initialization process, the encoder/decoder may output the array diagScan[sPos][sComp] regarding blkWidth which is the width of the input block, and blkHeight which is the height of the block. An array index sPos may represent a scan position, and may be a value in the range of [0, blkWidth*blkHeight−1]. When sComp, which is an array index, is 0, sPos may represent a horizontal component (x), and when sComp is 1, sPos may represent a vertical component (y). In the algorithm illustrated in FIG. 16, the x-coordinate and y-coordinate values on the two-dimensional coordinates at the scan position sPos may be understood as being assigned to diagScan[sPos][0] and diagScan[sPos][1], respectively, according to the up-right diagonal scan order. That is, the value stored in the DiagScanOrder[log 2BlockWidth][log 2BlockHeight][sPos][sComp] array may refer to a coordinate value corresponding to sComp at the sPos scan position in the up-right diagonal scan order of the block, of which width and height are 1<<log 2BlockWidth and 1<<log 2BlockHeight, respectively.

FIG. 17 illustrates the up-right diagonal scan order defined in FIG. 16 according to a block size. When both log 2BlockWidth and log 2BlockHeight are 2, it may denote a 4×4 sized block, and the numbers displayed in the gray shaded area in FIG. 17 indicate the scan position sPos. The x and y coordinate values at the sPos position may be assigned to DiagScanOrder[log 2BlockWidth][log 2BlockHeight][sPos][0] and DiagScanOrder[log 2BlockWidth][log 2BlockHeight][sPos][1], respectively.

Transform coefficient information may be coded based on the above-described scan order, and the present disclosure describes an embodiment based on a case in which an up-right diagonal scan method is used, but the present disclosure may be applied to other scanning methods as well. For example, other scanning methods may be a horizontal direction or a vertical direction scanning method.

On the other hand, the human visual system (HVS) has a sensitive characteristic in a low frequency band compared to a high frequency band. That is, since distortion existing in the high frequency band tends not to be easily recognized by humans, when the transform coefficient is quantized using the characteristic of the human visual system, the transform coefficient information may be efficiently coded. Specifically, the degree of quantization can be controlled according to the frequency position (index) of the transform coefficient. For example, since the distortion of the high frequency band is not easily recognized by humans, the higher the transform coefficient (the larger the frequency index), the larger the scaling value can be multiplied. This may be understood as the error due to quantization increasing as the frequency increases, but it is highly unlikely that humans could recognize the error. Accordingly, compared to a case where the same quantization degree is applied according to the frequency position, the image can be coded with a lower bit rate while maintaining the subjective image quality similarly. Alternatively, better subjective image quality may be maintained at the same bit rate. This is because, by using a variable scaling value according to the frequency position, it is possible to reduce distortion such as blocking artifacts or DC flickering that can be easily recognized by humans.

The encoder and the decoder may define a scaling matrix having the same size as the size of the transform block in order to use a different scaling value according to the frequency position (index) of the transform coefficient. Such a scaling matrix may be a preconfigured matrix or may be transmitted while being included in a bitstream without explicit signaling. The intermediate scaling factor array m[x][y] may be obtained based on a preconfigured value or a scaling matrix.

Hereinafter, in the present disclosure, a method for transmitting and deriving a scaling matrix and a method for applying the same will be described.

FIG. 18 illustrates an adaptation parameter set (APS) syntax structure. APS is a set including parameters required at the picture or slice level, and may be transmitted after SPS and PPS. The encoder may transmit parameters included in the SPS, PPS and APS in a bitstream, and the decoder may receive the parameters included in the SPS, PPS, and APS in a bitstream. Further, since the parameters are transmitted before the slice header, the APS may be referred to in the slice header. In the APS syntax structure, adaptation_parameter_set_id may be indicated first. The APS may have a unique ID value, and this ID may be used when referring to APS data in another syntax structure. For example, the slice header may include the ID of the APS to which the corresponding slice data will refer.

The aps_params_type indicating the type of the APS parameter may be indicated, and the range of the adaptation_parameter_set_id value may be determined according to the aps_params_type. When aps_params_type is 0, the APS parameter type may be adaptive loop filter (ALF) parameter ALF_APS, when aps_params_type is 1, the APS parameter type may be luma mapping with chroma scaling (LMCS) parameter LMCS_APS, and when aps_params_type is 2, the APS parameter type may be a scaling list parameter SCALING_APS required for scaling matrix derivation. According to the aps_params_type, the processing of alf_data( ), lmcs_data( ), or scaling_list_data( ) may be performed.

FIG. 19 illustrates a slice header syntax structure. sps_scaling_list_enabled_flag is an element included and indicated in the SPS. When sps_scaling_list_enabled_flag is 1, it may indicate that the scaling list is used in the scaling process of the transform coefficients. When sps_scaling_list_enabled_flag is 0, it may indicate that the scaling list is not used in the transform coefficient scaling process. When the scaling list is used in the transform coefficient scaling process (if sps_scaling_list_enabled_flag is 1), slice_scaling_list_present_flag indicating a method of deriving a scaling matrix may be indicated. If slice_scaling_list_present_flag is 1, a scaling list used for the current slice may be derived with reference to an APS (aps_params_type of the APS corresponds to SCALING_APS) including scaling list data. If slice_scaling_list_present_flag is 1, slice_scaling_list_aps_id may be signaled to indicate scaling list APS to be referred. slice_scaling_list_aps_id may indicate adaptation_parameter_set_id of the referred scaling list APS. If slice_scaling_list_present_flag is 0, it may indicate that the scaling list is derived from preconfigured values without using the scaling list transmitted through the APS. To this end, the decoder may store preconfigured values for the scaling list. If slice_scaling_list_present_flag does not exist (if not explicitly signaled), the flag may be configured to be 0.

FIG. 20 illustrates parameters used in the scaling list data syntax structure. In FIG. 20(a), sizeId may be defined from 0 to 6, and the size of the scaling matrix (quantization matrix) may be defined according to the value of sizeId as follows.

In case that sizeId is 0: 1×1 scaling matrix
In case that sizeId is 1: 2×2 scaling matrix
In case that sizeId is 2: 4×4 scaling matrix
In case that sizeId is 3: 8×8 scaling matrix
In case that sizeId is 4: 16×16 scaling matrix
In case that sizeId is 5: 32×32 scaling matrix
In case that sizeId is 6: 64×64 scaling matrix In FIG. 20(b), matrixId may be defined according to sizeId, CuPredMode (a variable indicating a prediction mode), and cIdx (a variable indicating a color component). CuPredMode is a variable indicating a prediction mode and if the CuPredMode is MODE_INTRA, it may indicate intra prediction, if the CuPredMode is MODE_INTER, it may indicate inter prediction, and if the CuPredMode is MODE_IBC, it may indicate intra block copy (IBC) prediction. cIdx is a variable representing a color component and if cIdx is 0, it may indicate a luma Y component, if cIdx is 1, it may indicate a chroma Cb component, and if cIdx is 2, it may indicate a chroma Cr component. According to sizeId, CuPredMode, and cIdx, matrixId may be defined as follows.

sizeId={2, 3, 4, 5, 6}, CuPredMode=MODE_INTRA, cIdx=0: matrixId=0
sizeId={1, 2, 3, 4, 5, 6}, CuPredMode=MODE_INTRA, cIdx=1: matrixId=1
sizeId={1, 2, 3, 4, 5, 6}, CuPredMode=MODE_INTRA, cIdx=2: matrixId=2
sizeId={2, 3, 4, 5, 6}, CuPredMode={MODE_INTER, MODE_IBC}, cIdx=0: matrixId=3
sizeId={1, 2, 3, 4, 5, 6}, CuPredMode={MODE_INTER, MODE_IBC}, cIdx=1: matrixId=4
sizeId={1, 2, 3, 4, 5, 6}, CuPredMode={MODE_INTER, MODE_IBC} cIdx=2: matrixId=5

FIG. 21 illustrates a scaling list data syntax structure. In FIG. 18, if aps_params_type is SCALING_APS, scaling_list_data( ) may be processed. In scaling_list_data( ), ScalingFactor[sizeId][sizeId][matrixId][x][y], which is a scaling matrix (quantization matrix), may be derived from ScalingList[sizeId][matrixId][i], which is a transmitted or preconfigured scaling list. Here, i may be a value in the range of [0, min(63, (1<<(sizeId<<1))−1)], and x and y may be a value in the range of [0, (1<<sizeId)−1]. Parsing of syntax elements related to ScalingList and a process of configuring of ScalingList may be performed with sizeId from 1 to 6 and matrixId from 0 to 5. However, if it is a matrixId related to luma (in case that matrixId is 0 or 3, which may indicate that the result of matrixId%3 operation is 0) and sizeId is 1, ScalingList[sizeId][matrixId][i] is not defined, and thus the parsing of syntax elements related to ScalingList and the process of configuring ScalingList may not be performed. In addition, if it is a matrixId related to chroma (in case that matrixId is 1, 2, 4, and 5, which may indicate that the result of matrixId%3 operation is not 0), and if sizeId is 6, ScalingList[sizeId][matrixId][i] is derived according to a preconfigured method without parsing the syntax element, and thus the parsing of the syntax element related to the ScalingList and the process of configuring the ScalingList may not be performed.

Meanwhile, since ScalingList needs to be defined according to matrixId and sizeId, if all ScalingList[sizeId][matrixId][i] are explicitly signaled, signaling overhead may be quite large. Accordingly, when the ScalingList is derived from preconfigured values or copied from another reference ScalingList, the amount of bits required for signaling the ScalingList can be reduced. To this end, scaling_list_pred_mode_flag[sizeId][matrixId] may be signaled. If scaling_list_pred_mode_flag[sizeId][matrixId] is 0, it may indicate that the value of the scaling list is the same as the value of the reference scaling list (that is, the current scaling list is derived from the reference scaling list), and scaling_list_pred_matrix_id_delta[sizeId][matrixId] may be signaled in order to indicate the referenced scaling list. If scaling_list_pred_matrix_id_delta[sizeId][matrixId] is 0, ScalingList[sizeId][matrixId][i] may be derived from preconfigured values. To this end, the decoder may store scaling values according to sizeId, matrixId, and i. If scaling_list_pred_matrix_id_delta[sizeId][matrixId] is not 0, refMatrixId, which is a reference matrixId, may be configured based on scaling_list_pred_matrix_id_delta[sizeId][matrixId], matrixId, sizeId, and ScalingList[sizeId][matrixId][i] may be configured to be the same value as the ScalingList[sizeId][refMatrixId][i].

If scaling_list_pred_mode_flag[sizeId][matrixId] is 1, it may indicate that the value of the scaling list is explicitly signaled, and the scaling list may be derived through additional syntax element signaling. The syntax related to the scaling list may include a scaling value applied to a DC coefficient and a difference factor between a current value (value at index i) and a previous value (value at index i−1) of the scaling list element. A value obtained by adding 8 to scaling_list_dc_coeff_minus8[sizeId−4][matrixId] may indicate a scaling value applied to a DC coefficient. Specifically, if sizeId is 4, scaling_list_dc_coeff_minus8[0][matrixId]+8 may be assigned to ScalingFactor[4][4][matrixId][0][0]. If sizeId is 5, scaling_list_dc_coeff_minus8[1][matrixId]+8 may be assigned to ScalingFactor[5]1[5][matrixId][0][0]. If sizeId is 6, scaling_list_dc_coeff_minus8[2][matrixId]+8 may be assigned to ScalingFactor[6][6][matrixId][0][0]. If scaling_list_pred_matrix_id_delta[sizeId][matrixId] is not 0 and sizeId is greater than 3, the value of scaling_list_dc_coeff_minus8[sizeId−4][matrixId] may be configured equal to the value of scaling_list_dc_coeff_minus8[sizeId−4][refMatrixId].

scaling_list_delta_coeff may represent a difference value between ScalingList[sizeId][matrixId][i] and Scaling List[sizeId][matrixId][i−1] when scaling_list_pred_mode_flag[sizeId][matrixId] is 1, and may be a value in the range of [−128, 127]. ScalingList[sizeId][matrixId] is a value greater than 0, and if scaling_list_delta_coeff does not exist (if not explicitly signaled) when scaling_list_pred_mode_flag[sizeId][matrixId] is 1, the ScalingList[sizeId][matrixId] may be configured to be 0.

The initial value of nextCoeff may be configured to be 8, and coefNum representing the number of elements of the ScalingList may be configured to be Min(64, (1<<(sizeId<<1))). Only if sizeId is greater than 3, scaling_list_dc_coeff_minus[sizeId−4][matrixId] may be signaled, and here, the initial value of nextCoeff may be configured to be scaling_list_dc_coeff_minus[sizeId−4][matrixId]+8.

In a for-loop statement, in order to determine ScalingList[sizeId][matrixId][i], the process of adding the difference value to the previous value may be performed. DiagScanOrder[3][3][i][0] and DiagScanOrder[3]3[i][1] may represent x-coordinate and y-coordinate corresponding to the scan index i in the up-right diagonal scan order defined in the 8×8 size, respectively. If sizeId is 6 and both x and y coordinates are equal to or greater than 4, scaling_list_delta_coef is not explicitly signaled, and ScalingList[sizeId][matrixId][i] may be configured to be 0. Otherwise, scaling_list_delta_coef may be signaled, and nextCoef may be determined by adding scaling_list_delta_coef to the previous value, nextCoeff. In order to express nextCoef as a preconfigured number of bits, an offset may be added and a modulo operation may be performed. The updated nextCoef may be assigned to ScalingList[sizeId][matrixId][i].

ScalingFactor[sizeId][sizeId][matrixId][x][y], which is a scaling matrix (quantization matrix), can be derived based on ScalingList[sizeId][matrixId][i] and scaling_list_dc_coef_minus8[sizeId−4][matrixId]. Both x and y may be values in the range of [0, (1<<sizeId)−1], x may correspond to a horizontal frequency index, and y may correspond to a vertical frequency index. That is, as x increases, a high-frequency band in the horizontal direction is referred to, and as y increases, a high-frequency band in the vertical direction is referred to. If both x and y are 0, it may denote DC.

2×2 scaling matrix, ScalingFactor[1][1][matrixId][x][y] (i is in the range of [0, 3] and matrixId is 1, 2, 4, and 5) may be derived as follows.

$x = \text{DiagScanOrder}[1][1][i][0]$ $y = \text{DiagScanOrder}[1][1][i][1]$ $\text{ScalingFactor}[1][1][\text{matrixId}][x][y] = \text{ScalingList}[1][\text{matrixId}][i]$ 4×4 scaling matrix, ScalingFactor[2][2][matrixId][x][y] (i is in the range of [0, 15] and matrixId is 0, 1, 2, 3, 4, and 5) may be derived as follows.

$x = \text{DiagScanOrder}[2][2][i][0]$ $y = \text{DiagScanOrder}[2][2][i][1]$ $\text{ScalingFactor}[2][2][\text{matrixId}][x][y] = \text{ScalingList}[2][\text{matrixId}][i]$ 8×8 scaling matrix, ScalingFactor[3][3][matrixId][x][y] (i is in the range of [0, 63], and matrixId is 0, 1, 2, 3, 4, and 5) may be derived as follows.

$x = \text{DiagScanOrder}[3][3][i][0]$ $y = \text{DiagScanOrder}[3][3][i][1]$ $\text{ScalingFactor}[3][3][\text{matrixId}][x][y] = \text{ScalingList}[3][\text{matrixId}][i]$ 16×16 scaling matrix, ScalingFactor[4][4][matrixId][x][y] (i is in the range of [0, 63], j is in the range of [0, 1], k is in the range of [0, 1], and matrixId is 0, 1, 2, 3, 4, and 5) may be derived as follows.

$x = \text{DiagScanOrder}[3][3][i][0]$ $y = \text{DiagScanOrder}[3][3][i][1]$ $$ScalingFactor[4][4][matrixId][x*2+k][y*2+j] =$$
$$ScalingList[4][matrixId][i]$$
$$ScalingFactor[4][4][matrixId][0][0] =$$
$$scaling\_list\_dc\_coef\_minus8[0][matrixId] + 8$$

32×32 scaling matrix, ScalingFactor[5][5][matrixId][x][y] (i is in the range of [0, 63], j is in the range of [0, 3], k is in the range of [0, 3], and matrixId is 0, 1, 2, 3, 4, and 5) may be derived as follows.

$x$=DiagScanOrder[3][3][$i$][0]

$y$=DiagScanOrder[3][3][$i$][1]

$$ScalingFactor[5][5][matrixId][x*4+k][y*4+j] =$$
$$ScalingList[5][matrixId][i]$$
$$ScalingFactor[5][5][matrixId][0][0] =$$
$$scaling\_list\_dc\_coef\_minus8[1][matrixId] + 8$$

64×64 scaling matrix, ScalingFactor[6][6][matrixId][x][y] (i is in the range of [0, 63], j is in the range of [0, 7], k is in the range of [0, 7], and matrixId is 0 and 3) may be derived as follows.

$x$=DiagScanOrder[3][3][$i$][0]

$y$=DiagScanOrder[3][3][$i$][1]

$$ScalingFactor[6][6][matrixId][x*8+k][y*8+j] =$$
$$ScalingList[6][matrixId][i]$$
$$ScalingFactor[6][6][matrixId][0][0] =$$
$$scaling\_list\_dc\_coef\_minus8[2][matrixId] + 8$$

When a color format is 4:4:4, 64×64 scaling matrix, ScalingFactor[6][6][matrixId][x][y](i is in the range of [0, 63], j is in the range of [0, 7], k is in the range of [0, 7] and matrixId is 1, 2, 4, and 5) may be derived as follows.

$x$=DiagScanOrder[3][3][$i$][0]

$y$=DiagScanOrder[3][3][$i$][1]

$$ScalingFactor[6][6][matrixId][x*8+k][y*8+j] =$$
$$ScalingList[5][matrixId][i]$$
$$ScalingFactor[6][6][matrixId][0][0] =$$
$$scaling\_list\_dc\_coef\_minus8[1][matrixId] + 8$$

The above-described ScalingFactor[sizeId][sizeId][matrixId][x][y] may be applied to a square transform block having a width of (1<<sizeId) and a height of (1<<sizeId) of the transform block. On the other hand, since the transform block may not be square, ScalingFactor should be applicable even when the width and height of the transform block are different. To this end, when the transform block is not a square, a ScalingFactor may be derived based on a scaling list of a square, the area of which is larger than that of the current block.

Meanwhile, information on the maximum size of the luma transform block may be indicated by being included in one of SPS and PPS. For example, sps_max_luma_transform_size_64_flag may be included in the SPS and signaled. When sps_max_luma_transform_size_64_flag is 1, it may indicate that the maximum transform size of the luma sample is 64, and when the sps_max_luma_transform_size_64_flag is 0, it may indicate that the maximum transform size of the luma sample is 32. Based on sps_max_luma_transform_size_64_flag, the variables MaxTbLog2SizeY and MaxTbSizeY may be configured as follows.

MaxTbLog2SizeY=sps_max_luma_transform_size_64_flag?6:5

MaxTbSizeY=1<MaxTbLog2SizeY

The variable MaxTbSizeY represents the maximum size of the luma transform block, and MaxTbLog2SizeY is a value obtained by taking a logarithm of the base 2 to MaxTbSizeY. In the above embodiment, it has been described that information on the maximum size of the luma transform block is signaled in the form of a flag at the SPS level and the maximum size of the luma transform block is determined to be either 64 or 32, but the present disclosure is not limited thereto. For example, a value obtained by taking a logarithm of the base 2 to the maximum size of the luma transform block may be directly signaled.

In the above embodiment, MaxTbLog2SizeY and MaxTbSizeY may be determined at the SPS level, and the parameters may also be applied to the picture, tile, and slice levels that are a lower level than the SPS.

In a case of the scaling matrix, size combinations of all transform blocks usable in pictures and slices should be defined, and the size combination of transform blocks may differ according to the maximum size of the luma transform block. For example, if MaxTbLog2SizeY is 5 and MaxTbSizeY is 32, which may be understood as that the maximum size of the luma transform block is 32 and that the maximum size of the luma transform block regarding all pictures, tiles, and slices below the current sequence is 32. That is, the 64×64 size transform kernel cannot be used in the current sequence, and the width or height of the transform block cannot be greater than 32. Therefore, since there is no ScalingFactor[wId][hId][matrixId][x][y] (wId is 6 or hId is 6) used in the current sequence, a syntax element required to derive ScalingFactor[wId][hId] is not explicitly signaling, and thus it is possible to greatly reduce the overhead required for the scaling list signaling.

FIG. 22 illustrates a scaling list data syntax structure considering the maximum size of a luma transform block. Details that are not described in FIG. 22 may be understood with reference to FIG. 21. Unlike the syntax structure of FIG. 21, the maximum value to which sizeId can be increased in the for-loop statement for sizeId may be configured based on information on the maximum size of the luma transform block determined at the SPS level, rather than a fixed value. For example, the maximum value to which sizeId can be increased may be configured to be MaxTbLog2SizeY configured based on sps_max_luma_transform_size_64_flag. Accordingly, a syntax element required for deriving a 64×64 scaling matrix that is not referenced in the current sequence may not be explicitly signaled, and the number of bits required for signaling a scaling list may be reduced. Specifically, scaling_list_pred_mode_flag[6][matrixId], scaling_list_pred_matrix_id_delta

[6][matrixId], scaling_list_dc_coef_minus8[2][matrixId], and scaling_list_delta_coef may not be signaled. In addition, the ScalingFactor[6]1[6][matrixId][x][y] derivation process described in FIG. 21 may not be performed, and the process of deriving ScalingFactor[wId][hId][matrixId][x][y] (when wId=6, hId<6 or wId<6, hId=6) from the ScalingFactor[6][6][matrixId][x][y] may not be performed. Accordingly, it is possible to reduce the complexity of the process of preparing parameters required for decoding before picture and slice decoding.

Meanwhile, in the encoding and decoding process, as the number of small-sized blocks increases, the throughput decreases, and therefore the minimum size of blocks allowed by the encoder and the decoder may be limited. For example, with regard to a chroma block, it is possible to limit the generation of blocks having sizes of 2×2, 2×4, and 4×2. Here, since ScalingFactor[1][1][matrixId][x][y], ScalingFactor[1][2][matrixId][x][y], ScalingFactor[2][1][matrixId][x][y] are not used, the related syntax element may not be explicitly signaled. To this end, in the for loop statement for sizeId of FIGS. 21 and 22, the initial value of sizeId may be configured to be 2. scaling_list_pred_mode_flag[1][matrixId], scaling_list_pred_matrix_id_delta[1][matrixId], and scaling_list_delta_coef elements may not be signaled, and the process of deriving ScalingFactor[1][1][matrixId][x][y], ScalingFactor[1][2] matrixId][x][y], and ScalingFactor[2][1][matrixId][x][y] may not be performed.

Hereinafter, in the present disclosure, a method for applying scaling to transform coefficients by using a scaling (quantization) matrix is described.

FIG. 23 illustrates a scaling process applied to transform coefficients. The scaling process may receive (xTbY, yTbY), nTbW, nTbH, cIdx, and bitDepth as inputs. A description of each variable is as follows.

(xTbY, yTbY): the luma location, which may indicate the upper-left coordinates of the current luma transform block, and may be coordinates based on luma samples on the upper left in the current picture.

nTbW: width of transform block nTbH: height of transform block cIdx: is a variable indicating a color component of the current transform block, and if cIdx is 0, the color component may be a luma Y component, if cIdx is 1, the color component may be a chroma Cb component, and if cIdx is 2, the color component may be a chroma Cr component.

bitDepth: bit depth of the current color component

The scaling process may perform scaling on the transform coefficients (quantized transform coefficients) to obtain a scaled transform coefficient (de-quantized transform coefficients), and may perform inverse transform on the scaled transform coefficient to reconstruct a residual signal. The scaled transform coefficient d[x][y] that is an output of the scaling process may be a data array having a size of (nTbW)×(nTbH).

In the scaling process, first, a quantization parameter (QP, qP variable) required for scaling may be derived. A quantization step size may be determined according to a quantization parameter value, and when the qP value increases by 6, the quantization step size may have a characteristic of increasing by two times.

The variable rectNonTsFlag may be derived as follows.

rectNonTsFlag=(((Log2(nTbW)+Log2(nTbH))&1)==1 && transform_skip_flag[xTbY][yTbY]==0)

The transform_skip_flag[xTbY][yTbY], which is a flag indicating whether transform is applied to the current block, may indicate whether transform is applied to the current luma transform block. When transform_skip_flag[xTbY][yTbY] is 1, it may indicate that there is no transform applied to the current luma transform block. When transform_skip_flag[xTbY][yTbY] is 0, it may indicate that another syntax element determines whether transform is applied to the current luma transform block.

The transform kernel itself based on sine and cosine may not be in an integer form. In order to express the transform kernel in an integer form, the transform kernel is multiplied by the exponent power of 2 (the exponent may not be an integer) and rounded, and thus the approximated integer transform kernel can be obtained. The orthonormal properties of the transform kernel may be weakened depending on the approximation error. However, a coding efficiency loss resulting therefrom is small and the implementation complexity of transform coding based on the integer transform kernel in the hardware encoder and decoder is remarkably low, and therefore it is possible to approximate the transform kernel in an integer form.

Since the integerized transform kernel itself is scaled up by the exponent power of 2, a process of lowering the scale again is required after performing the transform, and this downscaling can be performed in the scaling process and the transform process. The rectNonTsFlag and the bdShift variable to be described later may be understood as parameters for downscaling performed in the scaling process. When a result of the operation of (Log2(nTbW)+Log2(nTbH))&1 in rectNonTsFlag is 1, the transform coefficient after performing horizontal transform and vertical transform may be scaled up by 2^(N+0.5). When the result of operation of (Log2(nTbW)+Log2(notch))&1 is 0, the transform coefficient after performing the horizontal transform and vertical transform may be scaled up by 2^(M), and N and M are natural numbers. That is, in order to consider the sqrt(2) scaling factor according to the width and height of the transform block when inverse transform is performed, if a result of the operation of (Log2(nTbW)+Log2(nTbH))&1 is 1 when transform is performed on the current transform block (transform_skip_flag[xTbY][yTbY]==0), the rectNonTsFlag may be configured to be 1.

The bdShift and bdOffset variables can be configured as follows.

bdShift=bitDepth+((rectNonTsFlag?1:0)+(Log2(nTbW)+Log2(nTbH))/2)−5+dep_quant_enabled_flag bdOffset=(1<<bdShift)>>1

The dep_quant_enabled_flag may be indicated in the slice header, and when dep_quant_enabled_flag is 0, it may indicate that dependent quantization is disabled in the corresponding slice. When dep_quant_enabled_flag is 1, it may indicate that dependent quantization is enabled in the corresponding slice.

The levelScale[j][k] list may indicate the scaled quantization step size. The quantization step size is basically in the form of a real number, and the real number may be approximated in the form of an integer. In addition, as qP increases by 6, the quantization step size increases by 2 times and thus qP defines a quantization step size ranging from 0 to 5. Further, with regard to other qP durations, the quantization step size may be derived through qP%6 operation and qP/6 operation.

The (nTbW)×(nTbH) size array dz may be configured to be the same as TransCoeffLevel[xTbY][yTbY][cIdx], which is an (nTbW)×(nTbH) size array, and TransCoeffLevel

[xTbY][yTbY][cIdx] denotes a quantized transform coefficient obtained in residual coding.

The scaled transform coefficient d[x][y] (x=0, . . . , nTbW−1, y=0, . . . nTbH−1) may be obtained through the following process.

First, the intermediate scaling factor array m[x][y] may be configured as follows.

When sps_scaling_list_enabled_flag is 0 or transform_skip_flag[xTbY][yTbY] is 1, m[x][y] may be configured to be 16. A video signal processing apparatus may scale the current block based on the intermediate scaling factor array m[x][y]. This indicates that the same scaling value is used for all frequency indices x and y. if there is no transform applied to the current transform block, a method of applying a scaling value according to a frequency index cannot be applied because the dz array is not a frequency domain signal.

On the other hand, when sps_scaling_list_enabled_flag is 1 and transform_skip_flag[xTbY][yTbY] is 0, m[x][y] may be configured to be ScalingFactor[Log2(nTbW)][Log2(nTbH)][matrixId][x][y] that is a scaling (quantization) matrix.

The final scaling factor array, ls[x][y], may be configured based on m[x][y] and levelScale[j][k]. Specifically, when dep_quant_enabled_flag is 1, ls[x][y] may be configured to be (m[x][y]*levelScale[rectNonTsFlag][(qP+1)%6])<<((qP+1)/6). When rectNonTsFlag is 1, levelScale, in which the scale is increased by sqrt(2) compared to when rectNonTsFlag is 0, may be applied. When dep_quant_enabled_flag is 1, levelScale[rectNonTsFlag][(qP+1)%6] may be determined through (qP+1)%6 operation, and the quantization step size can be determined through ((qP+1)/6)-bit left shift operation. When dep_quant_enabled_flag is 0, ls[x][y] may be configured to be (m[x][y]*levelScale[rectNonTsFlag][qP%6])<<(qP/6).

Meanwhile, in a case of block-based delta pulse code modulation (BDPCM) prediction, intra prediction is performed in a preconfigured mode, and the quantized transform coefficient may be expressed as the sum of the samples at the previous location and the samples at the current location according to the preconfigured mode. That is, in the BDPCM mode, in connection with the quantized transform coefficient, the difference between the sample of the current position and the sample of the previous position is transmitted according to a preconfigured mode. The preconfigured mode may be a horizontal direction mode or a vertical direction mode. When the BDPCM is applied to the current coding block, BdpcmFlag[xTbY][yTbY] may be 1, and BdpcmDir[xTbY][yTbY] may indicate a preconfigured mode.

If BdpcmFlag[xTbY][yTbY] is 1 and BdpcmDir[xTbY][yTbY] is 0, it may indicate that BDPCM in the horizontal direction mode is applied, and dz[x][y] may be configured to be Clip3(CoeffMin, CoeffMax, dz[x−1][y]+dz[x][y]). The Clip3(x, y, z) operator is an operator for clipping the z value to a value between x and y. If z<x, Clip3(x, y, z)=x, if z>y, Clip3(x, y, z)=y, and otherwise, it may be expressed as (x<=z<=y) Clip3(x, y, z)=z. The transform coefficient may be expressed with preconfigured bit accuracy, which may be 16 bits. Here, CoeffMin may be configured to be −2^(16), and CoeffMax may be configured to be 2^(16)−1. When BdpcmFlag[xTbY][yTbY] is 1 and BdpcmDir[xTbY][yTbY] is 1, it may indicate that BDPCM in vertical direction mode is applied, and dz[x][y] may be configured to be Clip3(CoeffMin, CoeffMax, dz [x][y−1]+dz[x][y]).

dnc[x][y] may be calculated by (dz[x][y]*ls[x][y]+bdOffset)>>bdShift, and the scaled transform coefficient d[x][y] may be obtained through Clip3(CoeffMin, CoeffMax, and dnc[x][y]).

FIG. 24 illustrates a scaling process applied to transform coefficients according to another embodiment of the present disclosure. The details that are not described in FIG. 24 may follow the details described in FIG. 23.

As described in FIG. 23, rectNonTsFlag is a variable for considering that the scale is increased due to the transform kernel, and may be determined based on the width and height of the transform block and transform_skip_flag[xTbY][yTbY]. When transform_skip_flag[xTbY][yTbY] is 1, it may indicate that transform may be applied to the chroma transform block and there is no transform applied to the luma transform block. Therefore, according to the rectNonTsFlag configuring method described in FIG. 23, when transform_skip_flag[xTbY][yTbY] is 1, rectNonTsFlag is configured to be 0 even though transform is applied to the chroma transform block (when cIdx is 1 or 2) and thus the scale due to the transform kernel is increased. Therefore, a scale that increased due to the transform kernel at the bdShift and levelScale cannot be accurately considered, which can increase the quantization error.

In the scaling process of FIG. 24, recNonTsFlag may be configured as follows.

rectNonTsFlag=(((Log2(nTbW)+Log2(nTbH))&1)==1 && !(transform_skip_flag[xTbY][yTbY]&&cIdx==0))

In the above-described rectNonTsFlag determination formula, rectNonTsFlag may be determined, in a case of the luma transform block (if cIdx is 0), based on transform_skip_flag[xTbY][yTbY], the width nTbW of the transform block, and the height nTbH of the transform block. In a case of the chroma transform block (if cIdx is 1 or 2), rectNonTsFlag may be determined based on the width nTbW of the transform block and the height nTbH of the transform block regardless of transform_skip_flag[xTbY][yTbY]. That is, rectNonTsFlag may be determined based on cIdx, nTbW, nTbH, and transform_skip_flag[xTbY][yTbY].

The method of configuring the intermediate scaling factor array m[x][y] of FIG. 23 may be configured based on sps_scaling_list_enabled_flag and transform_skip_flag[xTbY][yTbY]. That is, if sps_scaling_list_enabled_flag is 0 or transform_skip_flag[xTbY][yTbY] is 1, m[x][y] may be configured to be 16, which is the same value in all frequency positions x and y, and this may indicate that different scaling factors are not applied depending on the frequency positions (indices). As described in the method for configuring the rectNonTsFlag variable, even if transform_skip_flag[xTbY][yTbY] is 1, the transform can be applied to a chroma transform block having cIdx of 1 or 2, and efficient transform coefficient scaling can be performed by applying different scaling factors depending on the frequency positions (indices). To this end, when cIdx is 1 or 2, m[x][y] may be determined according to another syntax element regardless of transform_skip_flag[xTbY][yTbY].

The scaling (quantization) matrix (array) is designed such that different scaling factors (different scaling values) are applied according to a spatial frequency index in a primary transformed frequency domain. Since HVS is insensitive to a high frequency region and sensitive to a low frequency region, quantization can be efficiently performed when a large scaling value is used in the high frequency region and a small scaling value is used in the low frequency region. This is because the quantization error caused by using a large scaling value in the high frequency region is highly unlikely to be recognized by humans.

Meanwhile, the secondary transform may be understood as mapping the primary transformed coefficients to another space, and the characteristics of the secondary transformed coefficients are completely different from those of the primary transformed coefficients. For example, when the secondary transform is not applied and only primary transform based on the DCT-II kernel is performed, d[0]1[0] may represent a DC coefficient. On the other hand, when secondary transform is performed on the DCT-II kernel-based primary transformed coefficient, d[0][0] does not denote a DC coefficient. In order to obtain DC coefficients of the primary transformed coefficients, the inner product of the secondary transformed coefficient vector and the first basis vector of the inverse secondary transform kernel needs to be performed, and this may be understood as that all the secondary transformed coefficients may affect the low-frequency region of the primary transformed coefficient. Therefore, considering different scaling factors regarding the secondary transformed coefficients according to indices x and y may deteriorate the performance of the quantizer as well as the subjective image quality. This is because, by multiplying the secondary transformed coefficient by a scaling matrix, the quantization error on the coefficient corresponding to the low-frequency region of the primary transformed coefficient increases. Since HVS is sensitive to distortion in the low frequency band, subjective image quality may be deteriorated. Accordingly, when a secondary transform is applied to the current transform block, m[x][y] may use the same value in all indices x and y. This value may be 16, and m[x][y] has a flat signal characteristic. Whether the secondary transform is applied to the current block is identified through the lfnst_idx[xTbY][yTbY] syntax element, and therefore m[x][y] may be configured based on lfnst_idx[xTbY][yTbY], the width nTbW of transform block, and the height nTbH of transform block.

According to the above description, the intermediate scaling factor array m[x][y] of FIG. 24 may be configured based on sps_scaling_list_enabled_flag, transform_skip_flag[xTbY][yTbY], cIdx, lfnst_idx[xTbY][yTbY], nTbW, and nTbH. When at least one of the following conditions 1, 2, and 3 is true, the intermediate scaling factor array m[x][y] may be configured to be the same value in all indices x and y. The same value may be a predetermined value, and may be 16. This may be understood as applying the same scaling factor (scaling value) at all x and y positions.

Condition 1 (indicated by line 2410): in case that sps_scaling_list_enabled_flag is 0

Condition 2 (indicated by line 2420): in case that transform_skip_flag[xTbY][yTbY] is 1 and luma transform block (cIdx) is 0

Condition 3 (indicated by line 2430): in case that lfnst_idx[xTbY][yTbY] is not 0 and both nTbW and nTbH are equal to or greater than 4

In condition 3 (indicated by line 2430), even if the secondary transform index lfnst_idx[xTbY][yTbY] is not 0, the secondary transform may not be applied to the transform block. The condition for applying the secondary transform to the current transform block may be a case where lfnst_idx[xTbY][yTbY] is not 0 and both the width and height of the transform block are equal to or greater than 4. For example, if lfnst_idx[xTbY][yTbY] is not 0 and the size of the luma transform block is 16×4, in connection with the 4:2:0 color format, the size of the chroma transform block corresponding thereto may be 8×2. Here, the secondary transform is applied to the luma transform block, but the secondary transform may not be applied to the chroma transform block even if lfnst_idx[xTbY][yTbY]) is not 0.

According to an embodiment of the present disclosure, a flag indicating whether a low frequency non-separable transform (LFNST) is applied may be acquired based on the secondary transform index lfnst_idx[xTbY][yTbY] in condition 3. The low frequency non-separable transform may refer to a secondary transform or an inverse secondary transform. If the flag indicating whether the low frequency non-separable transform is applied is 1, it may indicate that the low frequency non-separable transform is applied to the current block. The transform unit may perform a low frequency non-separable transform (secondary transform) based on the primary transformed coefficients. The inverse transform unit may perform an inverse transform (inverse secondary transform) relating to the low frequency non-separable transform based on the scaled (de-quantized) transform coefficient.

If the flag indicating whether the low frequency non-separable transform is applied is 0, it may indicate that the low frequency non-separable transform is not applied to the current block. The decoder may acquire the intermediate scaling factor array m[x][y] by using a flag indicating whether the low frequency non-separable transform is applied, instead of the secondary transform index lfnst_idx[xTbY][yTbY].

Further, according to an embodiment of the present disclosure, based on whether both nTbW and nTbH are equal to or greater than 4, it may be determined whether to obtain the intermediate scaling factor array m[x][y] from the bitstream. For example, when using the low frequency non-separable transform, if both the lengths (nTbW and nTbH) of one side of the current block are equal to or greater than 4, it may be inefficient to obtain the scaling factor from the bitstream. Therefore, when one of nTbW and nTbH is smaller than 4, it may indicate that the intermediate scaling factor array m[x][y] is obtained from the bitstream. Further, when both nTbW and nTbH are equal to or greater than 4, it may indicate that the intermediate scaling factor array m[x][y] is not obtained from the bitstream. That is, when both nTbW and nTbH are equal to or greater than 4, the intermediate scaling factor array m[x][y] may be configured to be a predetermined value. The predetermined value may be $2^n$. Here, n may be a natural number. The predetermined value may be, for example, 16.

To summarize, in condition 3, in case that the flag indicating whether the low frequency non-separable transform is applied indicates application of the low frequency non-separable transform to the current block, and the intermediate scaling factor array (m[x][y]) is not extracted from the bitstream, the intermediate scaling factor array may be configured to be a predetermined value. That is, the video signal processing apparatus may configure all factors included in the intermediate scaling factor array m[x][y] to be a predetermined value of 16. This may be understood as scaling the transform coefficients for all frequency indices x and y to the same extent. Accordingly, it is possible to minimize distortion that may occur in the low-frequency band of a block to which the low frequency non-separation transform is applied.

Even if condition 3 is not satisfied, when condition 2 is satisfied, the intermediate scaling factor array m[x][y] may be configured to be a predetermined value. That is, even if the flag indicating whether the low frequency non-separable transform is applied indicates that the low frequency non-separable transform is not applied to the current block or the scaling factor array non-use flag (scaling_matrix_for_lfnst_disabled_flag) is 0, the video signal processing apparatus may perform an operation of configuring all factors included in the intermediate scaling factor array to be predetermined values when a flag (transform_skip_flag) indicating whether transform is applied to the current block indicates that transform is not applied. When the scaling factor array non-use flag (scaling_matrix_for_lfnst_disabled_flag) is 0, it may be understood as that the scaling matrix is used for a block to which the low frequency non-separation transform is applied. That is, even if the flag indicating whether the low frequency non-separable transform is applied indicates that the low frequency non-separable transform is not applied to the current block, or the scaling factor array non-use flag (scaling_matrix_for_lfnst_disabled_flag) indicates that the scaling matrix is used for the current block, the video signal processing apparatus may perform an operation of configuring all factors included in the intermediate scaling factor array to be predetermined values when a flag (transform_skip_flag) indicating whether transform is applied to the current block indicates that transform is not applied.

The decoder may perform an operation of scaling transform coefficients for the current block based on the intermediate scaling factor array. The decoder may perform inverse transform of the scaled transform coefficient to obtain a residual. Further, the decoder may perform an operation of reconstructing the current block based on the residual and the predictor of the current block.

When conditions 1, 2, and 3 are all false, m[x][y] may be configured to be ScalingFactor[Log2(nTbW)][Log2(nTbH)][matrixId][x][y]. The ScalingFactor may be obtained based on the bitstream. For example, when conditions 1, 2, and 3 are all false and all factors included in the intermediate scaling factor array m[x][y] are not configured to be predetermined values, the decoder may perform an operation of deriving the intermediate scaling factor array m[x][y] based on a value (ScalingFactor) obtained from the bitstream. Since the process of acquiring the ScalingFactor has been described together with FIGS. 21 and 22, a redundant description will be omitted.

FIG. 25 illustrates a scaling process applied to transform coefficients according to another embodiment of the present disclosure.

The decoder may perform an operation of scaling transform coefficients for the current block based on the intermediate scaling factor array m[x][y]. Further, the decoder may perform an operation of inverse transforming the scaled transform coefficient to obtain a residual for the current block. Further, the decoder may perform an operation of reconstructing the current block based on the residual for the current block and the predictor of the current block. Hereinafter, these operations will be described in detail.

The scaling process may receive (xTbY, yTbY), treeType, nTbW, nTbH, predMode, and cIdx as inputs, and the description of each variable is as follows.

(xTbY, yTbY): the luma location, which may indicate samples on the upper left in the current luma transform block, and may be a position based on luma samples on the upper left in the current picture.

treeType: since there is a high correlation between the luma component and the chroma component, efficient image coding is possible if luma and chroma are encoded with the same coding tree structure. As another method, when luma and chroma components are encoded with different coding tree structures, coding efficiency may be improved. The variable treeType may be a variable (information) indicating the type of a currently processed tree. When treeType is SINGLE_TREE, it may be understood as that luma and chroma components are encoded with the same single coding tree (single tree). Here, the coding unit may include a luma block, and may additionally include a chroma block according to a color format. When the treeType is DUAL_TREE_LUMA, it may be understood as that luma and chroma components are encoded with different coding trees (dual trees), and that a currently processed component is a luma component tree. Here, the coding unit may include only the luma block. When treeType is DUAL_TREE_CHROMA, it may be understood as that luma and chroma components are encoded with different coding trees, and that a currently processed component is a chroma component tree. Here, the coding unit may include only the chroma block.

nTbW: width of transform block nTbH: height of the transform block predMode: is a variable indicating a prediction mode of a current coding unit. If the predMode is MODE_INTRA, it may indicate intra prediction, if the predMode is MODE_INTER, it may indicate inter prediction, and if the predMode is MODE_IBC, it may indicate IBC prediction (a prediction method for generating a prediction block from a reference block indicated by a block vector in the current picture).

cIdx: is a variable indicating a color component of the current transform block and if cIdx is 0, the color component may be a luma Y component, if cIdx is 1, the color component may be a chroma Cb component, and if cIdx is 2, the color component may be a chroma Cr component.

The scaling process may perform scaling on the transform coefficients (quantized transform coefficients) to obtain scaled transform coefficients (de-quantized transform coefficients). The scaled transform coefficient d[x][y] that is an output of the scaling process may be an array having a size of (nTbW)×(nTbH).

In the scaling process, first, a quantization parameter (QP, qP variable) required for scaling may be derived. A quantization step size may be determined according to a quantization parameter value, and when the qP value increases by 6, the quantization step size may have a characteristic of increasing by two times.

Variables rectNonTsFlag and bdShift may be derived as follows depending on whether transform skip is applied.

if transform skip is not applied (if transform_skip_flag [xTbY][yTbY][cIdx] is 0): the transform_skip_flag [xTbY][yTbY][cIdx] syntax element may indicate whether transform skip is applied to the current transform block, and if transform_skip_flag[xTbY][yTbY][cIdx] is 0, it may indicate that transform skip is not applied to the current transform block. This may be understood as obtaining residual samples by performing inverse transform on scaled (de-quantized) transform coefficients.

rectNonTsFlag=(((Log2(nTbW)+Log2(nTbH))&1)==1)? 1:0; the transform kernel itself based on sine and cosine may not be in an integer form as described with reference to FIG. 9, and in order to reduce implementation complexity, the transform kernel may be approximated to an integer form. In order to express the transform kernel in an integer form, the transform kernel is multiplied by the exponent power of 2 (the exponent may not be an integer) and rounded, and therefore it is possible to obtain the approximated integer transform kernel. The orthonormal properties of the transform kernel may be weakened depending on the approximation error. However, a coding efficiency loss resulting therefrom is small and the implementation complexity of transform coding based on the integer transform kernel in the hardware encoder and decoder is remarkably low, and therefore it is possible to use an integer transform kernel including the approximation error. Since the integerized transform kernel itself is scaled up by the exponent power of 2, a process of lowering the scale again is required after performing the transform, and this downscaling can be performed in the scaling process and the transform process. The rectNonTsFlag and the bdShift variable to be described later may be understood as parameters for downscaling performed in the scaling process. When a result of the operation of (Log2(nTbW)+Log2(nTbH))&1 in rectNonTsFlag is 1, the transform coefficient obtained after performing horizontal inverse transform and vertical inverse transform may be scaled up by $2^{(N+0.5)}$. When the result of operation of (Log2(nTbW)+Log2(nTbH))&1 is 0, the transform coefficient obtained after performing the horizontal inverse transform and vertical inverse transform may be scaled up by $2^{(M)}$, and N and M are natural numbers. That is, in order to consider the sqrt(2) scaling factor according to the width and height of the transform block when inverse transform is performed, if a result of the operation of (Log2(nTbW)+Log2(nTbH))&1 is 1 when inverse transform is performed on the current transform block (in case that transform_skip_flag[xTbY][yTbY][cIdx] is 0), the variable rectNonTsFlag may be configured to be 1. On the other hand, if a result of the operation of (Log2(nTbW)+Log2(nTbH))&1 is 0, the variable rectNonTsFlag may be configured to be 0.

bdShift=BitDepth+rectNonTsFlag+(Log2(nTbW)+Log2(nTbH))/2)−5+pic_dep_quant_enabled_flag: The variable BitDepth indicates the bit depth of the luma and chroma array samples. For example, when BitDepth is N (a natural number), the luma and chroma array samples may have values in the range of $[0, 2^N-1]$. The variable BitDepth may be configured based on a syntax element included in the SPS, PPS, picture header, slice header, and the like. For example, the bit_depth_minus8 syntax element may be signaled in order to perform signaling of bit depth information in the SPS. The decoder may configure the variable BitDepth to be 8+bit_depth_minus8 based on the parsed bit_depth_minus8 syntax element. pic_dep_quant_enabled_flag is a syntax element indicating whether dependent quantization is enabled/disabled in the current slice. When pic_dep_quant_enabled_flag is 1, it may indicate that dependent quantization is enabled in the current slice. The variable bdShift is a parameter for downscaling, and may be determined according to bit depth, whether the sqrt(2) scaling factor is considered, the size of a transform block, and whether dependent quantization is enabled/disabled.

When transform skip is applied (when transform_skip_flag[xTbY][yTbY][cIdx] is 1): a case, in which transform_skip_flag[xTbY][yTbY][cIdx] is 1, may indicate that transform skip is applied to the current transform block, and this may denote that a scaling (de-quantized) transform coefficient is used as a residual.

rectNonTsFlag=0: Since rectNonTsFlag is a variable that considers a scale factor increasing due to a transform kernel, the variable rectNonTsFlag may be configured to be 0 in a transform skip mode where no transform is applied.

bdShift=10: In a transform skip mode where transform and dependent quantization are not applied, the variable bdShift may be configured to be a fixed value of 10.

As described above, when transform skip is not applied and when transform skip is applied, rectNonTsFlag and bdShift may be derived using different method, and based on the bdShift variable, the bdOffset variable may be derived as follows.

bdOffset=(1<<bdShift)>>1: In a scaling process to be described later, a bit shift operation may be performed based on the bdShift parameter, and the variable bdOffset may indicate a rounding offset of the bit shift operation.

A levelScale[j][k] list used in a scaling process to be described later may indicate a scaled quantization step size. The quantization step size is basically in the form of a real number, which can be approximated in the form of an integer. In addition, as qP increases by 6, the quantization step size increases by 2 times and thus qP defines a quantization step size ranging from 0 to 5. Further, with regard to other qP durations, the quantization step size may be derived through qP%6 operation and qP/6 operation. Specifically, the element value of the levelScale list may be as follows.

levelScale[j][k]={{40, 45, 51, 57, 64, 72}, {57, 64, 72, 80, 90, 102}}, j=0, 1, k=0, 1, 2, 3, 4, 5

The (nTbW)×(nTbH) size array dz may be configured to be the same as TransCoeffLevel[xTbY][yTbY][cIdx], which is an (nTbW)×(nTbH) size array, and TransCoeffLevel[xTbT][yTbY][cIdx] denotes a quantized transform coefficient obtained in residual coding.

In addition, the decoder may perform an operation of inverse transforming of the scaled transform coefficient to obtain a residual. Here, the inverse transform may include an inverse primary transform and an inverse secondary transform. As already described, the inverse transform is performed in inverse transform units of the encoder and the decoder, and transform may be performed in the transform unit of the encoder. Since inverse transform is the inverse of transform, it has been described based on the transform for convenience of explanation in the present disclosure, and the redundant description of the inverse transform is omitted. As described above with reference to FIG. 24, the secondary transform may map the primary transformed coefficient to another space, and the secondary transformed coefficient may exhibit completely different characteristics from that of the primary transformed coefficient. Particularly, since all the secondary transformed coefficients may affect the low-frequency region of primary transformed coefficient, applying different scaling values to the secondary transformed coefficients according to indices x and y may deteriorate the performance of the quantizer as well as the subjective image quality. This is because, by multiplying the secondary transformed coefficient by a scaling matrix, the quantization error on the coefficient corresponding to the low-frequency region of the primary transformed coefficient increases. Since HVS is sensitive to distortion in the low frequency band, subjective image quality may be deteriorated. In addition, as described above with reference to FIG. 15, when the low frequency non-separable transform is applied to the current block, all the primary transform coefficients in the high-frequency region except for the upper-left sub-block may be configured to be 0. It may be inefficient to apply a variable scaling value based on the frequency index to the distribution of the transform coefficients. Accordingly, when a secondary transform is applied to the current transform block, m[x][y] may use the same value in all indices x and y. This value may be 16, and m[x][y] has a flat signal characteristic.

Accordingly, in the scaling process, in order to determine whether the secondary transform is applied to the current block, a flag variable (lfnstEnabledFlag) indicating whether the low frequency non-separable transform is applied may be configured. When lfnstEnabledFlag is 1, it may indicate that secondary transform is applied to the current block, and when lfnstEnabledFlag is 0, it may indicate that secondary transform is not applied. For example, when the flag (lfnstEnabledFlag), indicating whether the low frequency non-separable transform is applied, indicates application of the low frequency non-separable transform to the current block, the decoder may perform an operation of acquiring one or more inverse secondary transformed coefficients by performing inverse secondary transform of the scaled transform coefficient. The flag (lfnstEnabledFlag) indicating whether the low frequency non-separation transform is applied may be configured based on the secondary transform index lfnst_idx.

More specifically, the video signal processing apparatus may perform an operation of determining a flag (lfnstEnabledFlag) indicating whether to apply the low frequency non-separation transform, based on a secondary transform index and information indicating the type of a currently processed tree. The lfnstEnabledFlag, which is a flag indicating whether the low frequency non-separable transform is applied, may be configured to be 1 if the conditions of lines 2550, 2560, and 2570 are all true, and otherwise the lfnstEnabledFlag may be configured to be 0. However, the operation is not limited thereto, and the lfnstEnabledFlag, which is a flag indicating whether the low frequency non-separation transform is applied, may be configured to be 1 if at least one of the conditions of lines 2550, 2560, and 2570 is true, and otherwise, the lfnstEnabledFlag may be configured to be 0.

When the secondary transform index (lfnst_idx[xTbY][yTbY]) indicated in line 2550 is not 0: whether the secondary transform is applied may be indicated at the coding unit level, and specifically, the secondary transform index lfnst_idx [xTbY][yTbY]) may be signaled. lfnst_idx[xTbY][yTbY] may indicate whether LFNST (secondary transform) is applied, and may indicate a to-be-used transform kernel among multiple LFNST transform kernels. When lfnst_idx [xTbY][yTbY] is 0, it may indicate that there is no LFNST used in the current coding unit, and when lfnst_idx[xTbY][yTbY] is not 0, it may indicate that LFNST is used in the current coding unit. Specifically, when lfnst_idx[xTbY][yTbY] is i (i is a natural number), it may indicate that the i-th transform kernel is used in a transform kernel set including multiple transform kernels. Here, i may be 1 or 2.

When both the width (nTbW) and the height (nTbH) of the transform block indicated in line 2560 are equal to or greater than 4: the secondary transform may be applied when the size of the block is equal to or greater than a preconfigured size. Specifically, when lfnst_idx[xTbY][yTbY] is not 0, the secondary transform may be applied when both the width and height of the block are equal to or greater than 4. Here, the transform block may be included in the current block.

When information (treeType) indicating the type of a tree currently being processed, indicated in line 2570, is not SINGLE_TREE (in a case of DUAL_TREE_LUMA or DUAL_TREE_CHROMA), or the information (treeType) indicating the type of the tree currently being processed is SINGLE_TREE and is a luma component (in case that cIdx is 0): in case that LFNST is applied, since the decode may acquire residual samples after performing the inverse secondary transform and the inverse primary transform, delay time may increase compared to a case in which only the inverse primary transform is applied. In particular, the delay time caused by performing the secondary transform is the largest in a single tree (when the treeType is SINGLE_TREE) in which both luma and chroma components may exist, and thus in a case of a single tree, even if the above conditions indicated in the line 2550 and the line 2560 are all true, the secondary transform may not be applied to a specific component. Specifically, when the treeType is DUAL_TREE_LUMA or the treeType is DUAL_TREE_CHROMA, the secondary transform may be applied when the above conditions indicated in the line 2550 and the line 2560, are all true. When the treeType is SINGLE_TREE, the secondary transform may be applied only to the luma block (in case that cIdx is 0) when the above conditions indicated in the line 2550 and the line 2560 are all true. Even if the conditions indicated in line 2550 and the line 2560 are all true, the secondary transform may not be applied to the chroma block (in case that cIdx is 1 or 2) of a single tree.

The conditions indicated in the line 2550 and the line 2560 may be substantially the same. Accordingly, the video signal processing apparatus may use only one of conditions indicated in the line 2550 and the line 2560. For example, the encoder may transmit the secondary transform index lfnst_idx in a bitstream only when both the width (nTbW) and the height (nTbH) of the current block are equal to or greater than 4. The decoder may receive the secondary transform index lfnst_idx from the bitstream only when both the width (nTbW) and the height (nTbH) of the current block are equal to or greater than 4. Accordingly, the video signal processing apparatus may use only one of the conditions indicated in the line 2550 and the line 2560. That is, when the conditions indicated in the line 2550 and the line 2570 are all true, the video signal processing apparatus may configure the flag (lfnstEnabledFlag) indicating whether to apply the low frequency non-separation transform to be 1. When at least one of conditions indicated in the line 2550 and the line 2570 is false, the video signal processing apparatus may configure a flag (lfnstEnabledFlag) indicating whether to apply the low frequency non-separation transform to be 0. Alternatively, when the conditions indicated in the line 2560 and the line 2570 are all true, the video signal processing apparatus may configure a flag (lfnstEnabledFlag) indicating whether to apply the low frequency non-separation transform to be 1. Further, when at least one of conditions indicated in the line 2560 and the line 2570 is false, the video signal processing apparatus may configure a flag (lfnstEnabledFlag) indicating whether the low frequency non-separation transform is applied to be 0.

Referring to lines 2550 to 2570, which indicate conditions for configuration of a flag (lfnstEnabledFlag) indicating whether the low frequency non-separable transform is applied, the flag (lfnstEnabledFlag) indicating whether to apply the low frequency non-separation transform to the current block of the luma component may be configured as follows. The video signal processing apparatus may perform an operation of determining whether information (treeType) indicating the type of a tree currently being processed is SINGLE_TREE or DUAL_TREE_LUMA. Further, when the information (treeType) indicating the type of the tree currently being processed is SINGLE_TREE or DUAL_TREE_LUMA, the video signal processing apparatus may perform an operation of determining whether the secondary transform index is 0. In addition, if the secondary transform index (lfnst_idx) is not 0, the video signal processing apparatus is configured such that a flag (lfnstEnabledFlag) indicating whether the low frequency non-separable transform is applied to the luma component indicates application of the low frequency non-separable transform to the current block. When the secondary transform index (lfnst_idx) is 0, the video signal processing apparatus is configured such that a flag (lfnstEnabledFlag) indicating whether the low frequency non-separable transform is applied to the luma component indicates that the low frequency non-separable transform is not applied to the current block.

Referring to lines 2550 to 2570, which indicate conditions for configuration of a flag (lfnstEnabledFlag) indicating whether the low frequency non-separable transform is applied, the flag (lfnstEnabledFlag) indicating whether to apply the low frequency non-separable transform to the current block of the chroma component may be configured as follows. In case that information (treeType) indicating the type of the tree currently being processed is DUAL_TREE_CHROMA and the secondary transform index is not 0, the video signal processing apparatus is configured such that a flag (lfnstEnabledFlag) indicating whether the low frequency non-separable transform is applied to the chroma component indicates application of the low frequency non-separable transform to the current block. Further, in case that information (treeType) indicating the type of the tree currently being processed is not DUAL_TREE_CHROMA and the secondary transform index is 0, the video signal processing apparatus is configured such that a flag (lfnstEnabledFlag) indicating whether the low frequency non-separable transform is applied to the chroma component indicates that the low frequency non-separable transform is not applied to the current block.

When the above-described conditions indicated in the line 2550, line 2560, and line 2570 are all true, lfnstEnabledFlag may be configured to be 1, which may indicate that secondary transform is applied to the current block. Further, as already described, when the conditions indicated in the line 2550 and the line 2570 are all true, lfnstEnabledFlag may be configured to be 1, which may indicate that the secondary transform is applied to the current block. In addition, if the above conditions are not satisfied, lfnstEnabledFlag may be configured to be 0, which may indicate that secondary transform is not applied to the current block.

The decoder may perform an inverse transform on the scaled transform coefficient to obtain a residual. The inverse transform may include an inverse primary transform and an inverse secondary transform.

The scaled transform coefficient d[x][y] (x is in the range of 0 to nTbW−1, y is in the range of 0 to nTbH−1) may be obtained through the following process.

First, a process in which m[x][y], which is an intermediate scaling factor array, is derived may be performed. The video signal processing apparatus may perform an operation of determining the intermediate scaling factor array based on a flag (lfnstEnabledFlag) indicating whether the low frequency non-separation transform is applied. More specifically, according to the above description, the intermediate scaling factor array m[x][y] of FIG. 25 may be configured based on at least one of sps_scaling_list_enabled_flag, pic_scaling_list_present_flag, transform_skip_flag[xTbY][yTbY][cIdx], scaling_matrix_for_lfnst_disabled_flag, and lfnstEnabledFlag. If one or more of the conditions indicated in the lines 2510, 2520, 2530, or 2540 are true, m[x][y] may be configured to be one predetermined value at all indices x, y. The one predetermined value may be $2^4$n. Here, n may be a natural number. One predetermined value may be 16 for example. This may be understood as applying the same scaling factor (scaling value) at all x and y positions.

Referring to line 2510, in case that sps_scaling_list_enabled_flag is 0: Information indicating whether a scaling list is used in a scaling process may be included in at least one of higher-level syntax such as SPS, PPS, picture header, and slice header. For example, sps_scaling_list_enabled_flag may be signaled in SPS. When sps_scaling_list_enabled_flag is 1, it may indicate that the scaling list is used for scaling of transform coefficients in the scaling process, and when sps_scaling_list_enabled_flag is 0, it may indicate that the scaling list is not used for scaling for transform coefficients in the scaling process.

Referring to line 2520, in case that pic_scaling_list_present_flag is 0: if sps_scaling_list_enabled_flag is 1, information for referring to scaling list data may be additionally included in at least one of higher-level syntax such as SPS, PPS, picture header, and slice header. For example, pic_scaling_list_present_flag may be signaled in the picture header. When pic_scaling_list_present_flag is 1, it may indicate that scaling list data obtained by referring to the scaling list APS is used in the corresponding slice. Here, an identifier for referring to the scaling list APS may be additionally signaled. When pic_scaling_list_present_flag is 0, it may indicate that the scaling list m[x][y] used in the corresponding slice is configured to be the same value in all indices x and y, and this value may be 16.

Referring to line 2530, in case that a flag (transform_skip_flag[xTbY][yTbY][cIdx]) indicating whether transform is applied to the current block is 1: if transform is not applied to the current transform block (if transform skip is applied), the dz array is not a frequency domain signal and thus a method of applying a scaling value according to a frequency index cannot be applied.

Referring to line 2540, in case that a scaling factor array non-use flag (scaling_matrix_for_lfnst_disabled_flag) is 1 and a flag (lfnstEnabledFlag) indicating whether the low frequency non-separable transform is applied is 1: as described above, lfnstEnabledFlag, which is a variable indicating that the secondary transform is applied to the current block, may be configured. Here, lfnstEnabledFlag may be a flag indicating whether a low frequency non-separable transform (LFNST) is applied. The low frequency non-separable transform may refer to a secondary transform or an inverse secondary transform. When the flag (lfnstEnabledFlag) indicating whether the low frequency non-separable transform is applied is 1, it may indicate that the low frequency non-separable transform is applied to the current block. The transform unit may perform a low frequency non-separable transform (secondary transform) based on the primary transformed coefficient. The inverse transform unit may perform an inverse transform (inverse secondary transform) of the low frequency non-separable transform based on the scaled (de-quantized) transform coefficient.

When the flag (lfnstEnabledFlag) indicating whether the low frequency non-separable transform is applied is 0, it may indicate that the low frequency non-separable transform is not applied to the current block.

When a secondary transform is applied, m[x][y] may be configured to be one predetermined value for all indices x and y. Here, one predetermined value may be $2^n$. Here, n may be a natural number. One predetermined value may be 16 for example.

Meanwhile, a flag (lfnstEnabledFlag) indicating whether the low frequency non-separation transform is applied may be configured based on the secondary transform index (lfnst_idx[xTbY][yTbY]), and lfnst_idx[xTbY][yTbY] may be obtained after residual coding for the luma and chroma components. This may lead to another delay time in the hardware decoder. When deriving the intermediate scaling factor array m[x][y] without being dependent on lfnst_idx[xTbY][yTbY], the decoder may perform the scaling process (dequantization) on the luma block immediately after performing coding of the luma transform coefficients. Therefore, high throughput can be guaranteed. On the other hand, when deriving the intermediate scaling factor array based on lfnst_idx[xTbY][yTbY], even if the coefficient coding for the luma block is completed, it is required to wait until the coefficient coding for the chroma block is all performed, which may lead to delay time corresponding thereto. This delay time may be fatal in specific application fields. To this end, control information may be included in at least one of SPS, PPS, picture header, slice header, and scaling list data syntax (scaling_list_data). For example, scaling_matrix_for_lfnst_disabled_flag may be signaled by being included in the scaling_list_data ( ) syntax structure. The scaling factor array non-use flag (scaling_matrix_for_lfnst_disabled_flag) may be obtained from at least one bitstream of SPS, PPS, picture header, or slice header. In more detail, the scaling factor array non-use flag (scaling_matrix_for_lfnst_disabled_flag) may be obtained from the bitstream of the SPS.

scaling_matrix_for_lfnst_disabled_flag may be a scaling factor array non-use flag. When scaling_matrix_for_lfnst_disabled_flag is 1, it may indicate that m[x][y] is configured to be the same value in all indices x and y regarding a block to which LFNST is applied. That is, when the scaling factor array non-use flag (scaling_matrix_for_lfnst_disabled_flag) is 1, it may indicate that the scaling matrix (ScalingFactor) is not used for a block to which the low frequency non-separation transform is applied. Further, when the scaling factor array non-use flag (scaling_matrix_for_lfnst_disabled_flag) is 1, m[x][y] may be configured to be one predetermined value. One predetermined value may be $2^{\wedge}n$. Here, n may be a natural number. One predetermined value may be 16 for example. On the other hand, when the scaling factor array non-use flag (scaling_matrix_for_lfnst_disabled_flag) is 0, it may indicate that a scaling list m[x][y] that can be variably configured according to indices x and y may also be applied to a block to which the LFNST is applied. That is, when the scaling factor array non-use flag (scaling_matrix_for_lfnst_disabled_flag) is 0, it may indicate that the scaling matrix (ScalingFactor) is used for a block to which the low frequency non-separation transform is applied, and m[x][y] may be configured based on the scaling matrix (ScalingFactor). Here, since the decoder can derive the scaling list without being based on lfnst_idx[xTbY][yTbY], it is possible to reduce the delay time generated in the scaling process.

To summarize, referring to line 2540, in case that the flag (lfnstEnabledFlag), indicating whether the low frequency non-separable transform is applied, indicates application of the low frequency non-separable transform and the scaling factor array non-use flag (scaling_matrix_for_lfnst_disabled_flag) is 1, all factors included in the intermediate scaling factor array m[x][y] may be configured to be one predetermined value. One predetermined value may be $2^{\wedge}n$. Here, n may be a natural number. One predetermined value may be 16 for example. When the flag (lfnstEnabledFlag) indicating whether the low frequency non-separation transform is applied indicates that the low frequency non-separation transform is not applied, or when the scaling factor array non-use flag (scaling_matrix_for_lfnst_disabled_flag) is 0, the video signal processing apparatus may determine whether to configure all factors included in the scaling factor array m[x][y] to be predetermined values by further determining conditions indicated in line 2510 to line 2530.

For example, even if the conditions indicated in line 2540 are not satisfied, when the conditions indicated in line 2530 are satisfied, the intermediate scaling factor array m[x][y] may be configured to be a predetermined value. That is, even if the flag (lfnstEnabledFlag), indicating whether the low frequency non-separable transform is applied, indicates that the low frequency non-separable transform is not applied or the scaling factor array non-use flag (scaling_matrix_for_lfnst_disabled_flag) is 0, the video signal processing apparatus may perform an operation of configuring all factors included in the intermediate scaling factor array to be predetermined values when a flag (transform_skip_flag), indicating whether transform is applied to the current block, indicates that transform is not applied. In addition, even if a flag (lfnstEnabledFlag), indicating whether the low frequency non-separable transform is applied, indicates that the low frequency non-separable transform is not applied, or a scaling factor array non-use flag (scaling_matrix_for_lfnst_disabled_flag) indicates that a scaling matrix is used for a block to which the low frequency non-separable transform is applied, the video signal processing apparatus may perform an operation of configuring all factors included in the intermediate scaling factor array to be predetermined values when a flag (transform_skip_flag), indicating whether transform is applied to the current block, indicates that transform is not applied.

In case that one or more of the conditions described above in line 2510, line 2520, line 2530, or line 2540 are true, m[x][y] is configured to be the same value in all indices x and y. This value may be 16. This may be understood as applying the same scaling factor (scaling value) at all x and y positions.

On the other hand, if the conditions indicated in line 2510, line 2520, line 2530, and line 2540 are all false, the intermediate scaling factor array (m[x][y]) may be derived based on information obtained from scaling_list_data ( ) by referring to scaling list APS. Information obtained from scaling_list_data ( ) may be, for example, ScalingFactor. The information obtained from scaling_list_data ( ) may denote information obtained from the bitstream. The ScalingFactor may be obtained based on the bitstream. For example, the conditions indicated in line 2510, line 2520, line 2530, or line 2540 are all false, and thus all factors included in the intermediate scaling factor array m[x][y] are not configured to be a predetermined value, the decoder may perform an operation of deriving the intermediate scaling factor array m[x][y] based on the value obtained from the bitstream. Here, the intermediate scaling factor array m[x][y] may have values that change according to the frequency indices x and y, and efficient scaling according to the frequency component can be performed.

The decoder may perform scaling the transform coefficients for the current block based on the intermediate scaling factor array m[x][y]. More specifically, the final scaling factor array ls[x][y] may be configured based on m[x][y] and levelScale[j][k]. When dependent quantization is applied (in case that pic_dep_quant_enabled_flag is 1 and transform_skip_flag[xTbY][yTbY][cIdx] is 0), ls[x][y] may be configured to be (m[x][y]*levelScale[rectNonTsFlag][(qP)+1)%6])<<((qP+1)/6). When rectNonTsFlag is 1, levelScale in which the scale is increased by sqrt(2) may be applied compared to when rectNonTsFlag is 0. If (qP+1)/6 bit-left shift is performed on the base quantization step size (levelScale[rectNonTsFlag][(qP+1)%6]) by using (qP+1)%6 as an index, the final quantization step size can be determined. This may reflect the characteristic that the quantization step size increases by two times when dependent quantization is applied and (qP+1) increases by 6. On the other hand, when dependent quantization is not applied (in case that pic_dep_quant_enabled_flag is 0 or transform_skip_flag

[xTbY][yTbY][cIdx] is 1), ls[x][y] may be configured to be (m[x][y]*levelScale[rectNonTsFlag][qP%6])<<(qP/6). The final quantization step size can be determined by performing a bit-left shift by qP/6 to the base quantization step size (levelScale[rectNonTsFlag][qP%6]) by using qP%6 as an index. This may reflect the characteristic that the quantization step size increases by two times when dependent quantization is not applied and qP is increased by 6.

Meanwhile, in a case of block-based delta pulse code modulation (BDPCM) prediction, intra prediction is performed in a preconfigured mode, and the quantized transform coefficient may be expressed as the sum of the samples at the previous location and the samples at the current location according to the preconfigured mode. That is, in the BDPCM mode, with regard to the quantized transform coefficient, the difference between the sample of the current position and the sample of the previous position is transmitted according to a preconfigured mode. The preconfigured mode may be a horizontal direction mode or a vertical direction mode. When the BDPCM is applied to the current coding block, BdpcmFlag[xTbY][yTbY] may be 1, and BdpcmDir[xTbY][yTbY] may indicate a preconfigured mode.

If BdpcmFlag[xTbY][yTbY] is 1 and BdpcmDir[xTbY][yTbY] is 0, it may indicate that BDPCM in the horizontal direction mode is applied, and dz[x][y] may be configured to be Clip3(CoeffMin, CoeffMax, dz[x−1][y]+dz[x][y]). The Clip3(x, y, z) operator is an operator for clipping the z value to a value between x and y. If z<x, Clip3(x, y, z)=x, if z>y, Clip3(x, y, z)=y, and otherwise, it may be expressed as (x<=z<=y) Clip3(x, y, z)=z. The transform coefficient may be expressed with preconfigured bit accuracy, which may be 16 bits. Here, CoeffMin may be configured to be $-2^{(16)}$, and CoeffMax may be configured to be $2^{(16)}-1$. When BdpcmFlag[xTbY][yTbY] is 1 and BdpcmDir[xTbY][yTbY] is 1, it may indicate that BDPCM in vertical direction mode is applied, and dz[x][y] may be configured to be Clip3(CoeffMin, CoeffMax, dz [x][y−1]+dz[x][y]).

dnc[x][y] may be calculated by (dz[x][y]*ls[x][y]+bdOffset)>>bdShift, and the scaled transform coefficient d[x][y] may be obtained through Clip3(CoeffMin, CoeffMax, and dnc[x][y]).

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including instructions executable by a computer, such as a program module executed by a computer. A computer-readable medium may be any available medium that is accessible by a computer, and includes both volatile and nonvolatile media, removable and non-removable media. Further, the computer-readable medium may include both computer storage media and communication media. The computer storage medium includes both volatile and nonvolatile, removable and non-removable media implemented in any method or technology for storage of information such as computer readable instructions, data structures, program modules or other data. The communication media typically include computer readable instructions, data structures, other data in a modulated data signal such as program modules, or other transmission mechanisms, and include any information delivery media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A video signal decoding apparatus comprising a processor,
    wherein the processor is configured to:
    scale a transform coefficient for a current block based on an intermediate scaling factor array,
    obtain a residual for the current block based on the scaled transform coefficient,
    reconstruct the current block based on the residual,
    wherein when a low frequency non-separable transform (LFNST) is applied to the current block, the residual is obtained based on the LFNST,
    wherein whether the LFNST is applied to the current block is indicated by a first flag,
    wherein the first flag indicating whether the LFNST is applied to the current block is determined based on a LFNST index,
    wherein the LFNST index indicates whether the LFNST is applied to the current block and a kernel to be used for the LFNST,
    wherein when the LFNST is applied to the current block, a prediction mode of the current block is an intra prediction mode,
    when the first flag indicates that the LFNST is applied to the current block and a second flag indicating whether a scaling matrix is used in a block to which the LFNST is applied indicates that the scaling matrix is not used in the block to which the LFNST is applied, all factors included in the intermediate scaling factor array are set to one predetermined value.

2. The video signal decoding apparatus of claim 1,
    wherein when a third flag indicating whether transform is applied to the current block indicates that the transform is not applied to the current block, the all factors included in the intermediate scaling factor array are set to the one predetermined value.

3. The video signal decoding apparatus of claim 1,
wherein the intermediate scaling factor array is derived based on values obtained from a bitstream when failing to set the all factors included in the intermediate scaling factor array to the one predetermined value.

4. The video signal decoding apparatus of claim 1,
wherein the second flag is obtained from at least one of a sequence parameter set (SPS), a picture parameter set (PPS), a picture header, and a slice header of a bitstream.

5. The video signal decoding apparatus of claim 1,
wherein the first flag indicating whether the LFNST is applied to the current block is determined further based on a type of a current coding tree.

6. The video signal decoding apparatus of claim 5,
when the type of the current coding tree is a SINGLE_TREE or DUAL_TREE_LUMA:
wherein when the LFNST index is 0, the first flag indicates that the LFNST is not applied to the current block,
wherein when the LFNST index is not 0, the first flag indicates that the LFNST is applied to the current block,
wherein a color component of the current block is a luma component,
wherein the SINGLE_TREE indicates that a single tree is used to partition the current coding tree including the current block,
wherein the DUAL_TREE_LUMA indicates that a dual tree is used to partition the current coding tree including the current block and the luma component is currently processed.

7. The video signal decoding apparatus of claim 5,
wherein when the LFNST index is 0 or the type of the current coding tree is not a DUAL_TREE_CHROMA, the first flag indicates that the LFNST is not applied to the current block,
wherein when the LFNST index is not 0 and the type of the current coding tree is the DUAL_TREE_CHROMA, the first flag indicates that the LFNST is applied to the current block,
wherein a color component of the current block is a chroma component,
wherein the DUAL_TREE_CHROMA indicates that a dual tree is used to partition the current coding tree and the chroma component is currently processed.

8. The video signal decoding apparatus of claim 1, wherein the one predetermined value is 2^N, and N is a natural number.

9. The video signal decoding apparatus of claim 1, wherein the one predetermined value is 16.

10. A video signal encoding apparatus comprising a processor,
wherein the processor is configured to:
obtain a bitstream to be decoded by a decoder using a decoding method, the decoding method comprising:
scaling a transform coefficient for a current block based on an intermediate scaling factor array;
obtaining a residual for the current block based on the scaled transform coefficient; and
reconstructing the current block based on the residual,
wherein when a low frequency non-separable transform (LFNST) is applied to the current block, the residual is obtained based on the LFNST,
wherein whether the LFNST is applied to the current block is indicated by a first flag,
wherein the first flag indicating whether the LFNST is applied to the current block is determined based on a LFNST index,
wherein the LFNST index indicates whether the LFNST is applied to the current block and a kernel to be used for the LFNST,
wherein when the LFNST is applied to the current block, a prediction mode of the current block is an intra prediction mode,
when the first flag indicates that the LFNST is applied to the current block and a second flag indicating whether a scaling matrix is used in a block to which the LFNST is applied indicates that the scaling matrix is not used in the block to which the LFNST is applied, all factors included in the intermediate scaling factor array are set to one predetermined value.

11. The video signal encoding apparatus of claim 10,
wherein when a third flag indicating whether transform is applied to the current block indicates that the transform is not applied to the current block, the all factors included in the intermediate scaling factor array are set to the one predetermined value.

12. The video signal encoding apparatus of claim 10,
wherein the intermediate scaling factor array is derived based on values obtained from the bitstream when failing to set the all factors included in the intermediate scaling factor array to the one predetermined value.

13. The video signal encoding apparatus of claim 10,
wherein the second flag is obtained from at least one of a sequence parameter set (SPS), a picture parameter set (PPS), a picture header, and a slice header of the bitstream.

14. The video signal encoding apparatus of claim 10,
wherein the first flag indicating whether the LFNST is applied to the current block is determined further based on a type of a current coding tree.

15. The video signal encoding apparatus of claim 14,
when the type of the current coding tree is a SINGLE_TREE or DUAL_TREE_LUMA:
wherein when the LFNST index is 0, the first flag indicates that the LFNST is not applied to the current block,
wherein when the LFNST index is not 0, the first flag indicates that the LFNST is applied to the current block,
wherein a color component of the current block is a luma component,
wherein the SINGLE_TREE indicates that a single tree is used to partition the current coding tree including the current block,
wherein the DUAL_TREE_LUMA indicates that a dual tree is used to partition the current coding tree including the current block and the luma component is currently processed.

16. The video signal encoding apparatus of claim 14,
wherein when the LFNST index is 0 or the type of the current coding tree is not a DUAL_TREE_CHROMA, the first flag indicates that the LFNST is not applied to the current block,
wherein when the LFNST index is not 0 and the type of the current coding tree is the DUAL_TREE_CHROMA, the first flag indicates that the LFNST is applied to the current block,
wherein a color component of the current block is a chroma component,
wherein the DUAL_TREE_CHROMA indicates that a dual tree is used to partition the current coding tree and the chroma component is currently processed.

17. The video signal encoding apparatus of claim 10, wherein the one predetermined value is $2^N$, and N is a natural number.

18. The video signal decoding apparatus of claim 10, wherein the one predetermined value is 16.

19. A method of obtaining a bitstream, the method comprising:
- scaling a transform coefficient for a current block based on an intermediate scaling factor array;
- obtaining a residual for the current block based on the scaled transform coefficient; and
- obtaining the bitstream including information for the transform coefficient,
- wherein when a low frequency non-separable transform (LFNST) is applied to the current block, the residual is obtained based on the LFNST,
- wherein whether the LFNST is applied to the current block is indicated by a first flag,
- wherein the first flag indicating whether the LFNST is applied to the current block is determined based on a LFNST index,
- wherein the LFNST index indicates whether the LFNST is applied to the current block and a kernel to be used for the LFNST,
- wherein when the LFNST is applied to the current block, a prediction mode of the current block is an intra prediction mode,
- when the first flag indicates that the LFNST is applied to the current block and a second flag indicating whether a scaling matrix is used in a block to which the LFNST is applied indicates that the scaling matrix is not used in the block to which the LFNST is applied, all factors included in the intermediate scaling factor array are set to one predetermined value.

20. The method of claim 19,
- wherein the intermediate scaling factor array is derived based on values obtained from the bitstream when failing to set the all factors included in the intermediate scaling factor array to the one predetermined value.

\* \* \* \* \*